ELECTRICAL BINARY COMPUTER APPARATUS

Filed Aug. 14, 1958 19 Sheets-Sheet 1

INVENTORS
William D. Rowe &
Terry A. Jeeves.
BY [signature]
ATTORNEY

Feb. 19, 1963 W. D. ROWE ET AL 3,078,040

ELECTRICAL BINARY COMPUTER APPARATUS

Filed Aug. 14, 1958 19 Sheets-Sheet 2

Feb. 19, 1963 W. D. ROWE ET AL 3,078,040

ELECTRICAL BINARY COMPUTER APPARATUS

Filed Aug. 14, 1958 19 Sheets-Sheet 6

Feb. 19, 1963 W. D. ROWE ET AL 3,078,040

ELECTRICAL BINARY COMPUTER APPARATUS

Filed Aug. 14, 1958 19 Sheets-Sheet 13

ELECTRICAL BINARY COMPUTER APPARATUS

Filed Aug. 14, 1958

19 Sheets-Sheet 17

Feb. 19, 1963 W. D. ROWE ET AL 3,078,040

ELECTRICAL BINARY COMPUTER APPARATUS

Filed Aug. 14, 1958 19 Sheets-Sheet 18

3,078,040

ELECTRICAL BINARY COMPUTER APPARATUS

William D. Rowe, Snyder, N.Y., and Terry A. Jeeves, Penn Hills Township, Allegheny County, Pa., assignors to Westinghouse Electric Corporation, East Pittsburgh, Pa., a corporation of Pennsylvania Filed Aug. 14, 1958, Ser. No. 755,062
12 Claims. (Cl. 235—164)

The present invention relates, in general, to electrical computer apparatus, and more particularly, to electrical binary computer apparatus suitable for automatic control and decision applications.

It is an object of the present invention to provide an improved electrical computer apparatus which is more simple and reliable and faster in operation and requires less complex circuitry than previous computer devices.

It is a further object of the present invention to provide an improved electrical binary computer apparatus utilizing a common circuit element throughout as a similar or standard circuit device as the main component and thereby facilitating any maintenance and repair of that computer apparatus that may become necessary and desirable.

It is an additional object of the present invention to provide an improved electrical binary computing apparatus using static circuit elements capable of long, reliable and trouble-free operation and using a minimum of dissimilar components and having a minimum time response characteristic.

It is a still further object of the present invention to provide an improved electrical computer apparatus for use with two or more binary numbers of up to and including N digits, which apparatus uses basic unitary circuit components such as NOR circuits, with each of said NOR circuits having a similar circuit arrangement and a similar operative characteristic to facilitate the servicing and maintenance of said computer apparatus and to improve the reliability of said apparatus.

It is a still additional object of the present invention to provide improved electrical binary computer apparatus having a more stable operation characteristic over wider ranges of temperature and having a smaller physical size for a greater data handling capability and having lower power requirements and using standardized components to enable a lower cost of construction and having a greater flexibility of utility and operation.

It is a different object to provide an improved computer apparatus operative to provide and generate carry signals prior to the receipt of an execute control pulse.

It is a still different object of the present invention to provide an improved computer apparatus that does not require intentional time delay circuits in the register counter circuits for handling the binary information stored in said register devices.

These and other objects and advantages of the present invention will become still more apparent from a study of the following description taken in conjunction with the drawings, wherein.

As industrial control problems become increasingly more difficult and complicated, the use of both general purpose and special purpose type digital computer apparatus as control and decision devices is becoming of greater importance. The ability of digital computer devices to handle large amounts of data and make more rapid and accurate calculations makes these devices quite adaptable to these industrial applications suitable for automatic control.

The most important limitation in applying prior art digital computer devices to industrial control problems has been the relative low level of reliability of these devices. An operating industrial machine with even a fraction of one percent of down time or non-operating time is in many instances not satisfactory as being too unreliable. Further, in certain types of industrial machines, if only a single failure should occur, this single failure may be very disastrous and extremely expensive, and therefore, it is very desirable that fail-safe type of control device for that machine be provided.

In accordance with the teachings of the present invention a computer device having a greater inherent reliability and thereby more desirable for industrial control applications has been provided wherein the complete digital computer devices has been designed and constructed using but a single common building block, namely, a NOR circuit. The NOR circuit has been successfully proven to be highly reliable, and by building a digital computer device with but a single common component such as the NOR circuit, the maintenance and testing of such a computer device is greatly facilitated in that each of the NOR circuits can be easily tested as may be desired and each of the NOR circuits has the same operational characteristic and can be readily replaced in the event that such replacement should be desirable.

The use of the NOR circuit as a common building block type of component for the present computer device has other advantages other than the greater reliability. It provides improved operating range relative to conditions of temperature, smaller physical size, lower power requirements, use of non-critical components and lower cost of construction and greater flexibility of utilization. Further, with the use of the NOR circuit as a building block, the computer device is almost completely transistorized to improve the stability of operation and reliability, and only the coincident current cores of the magnetic core memory and the mechanical input and output devices are not transistorized.

Although the present computer device is primarily designed for use on in-line industrial automatic control problems and applications, it is still in essence a general purpose type of computer device. It basically contains an input unit, an output unit, a memory unit, a control unit and an arithmetic unit.

Figures 1, 2:
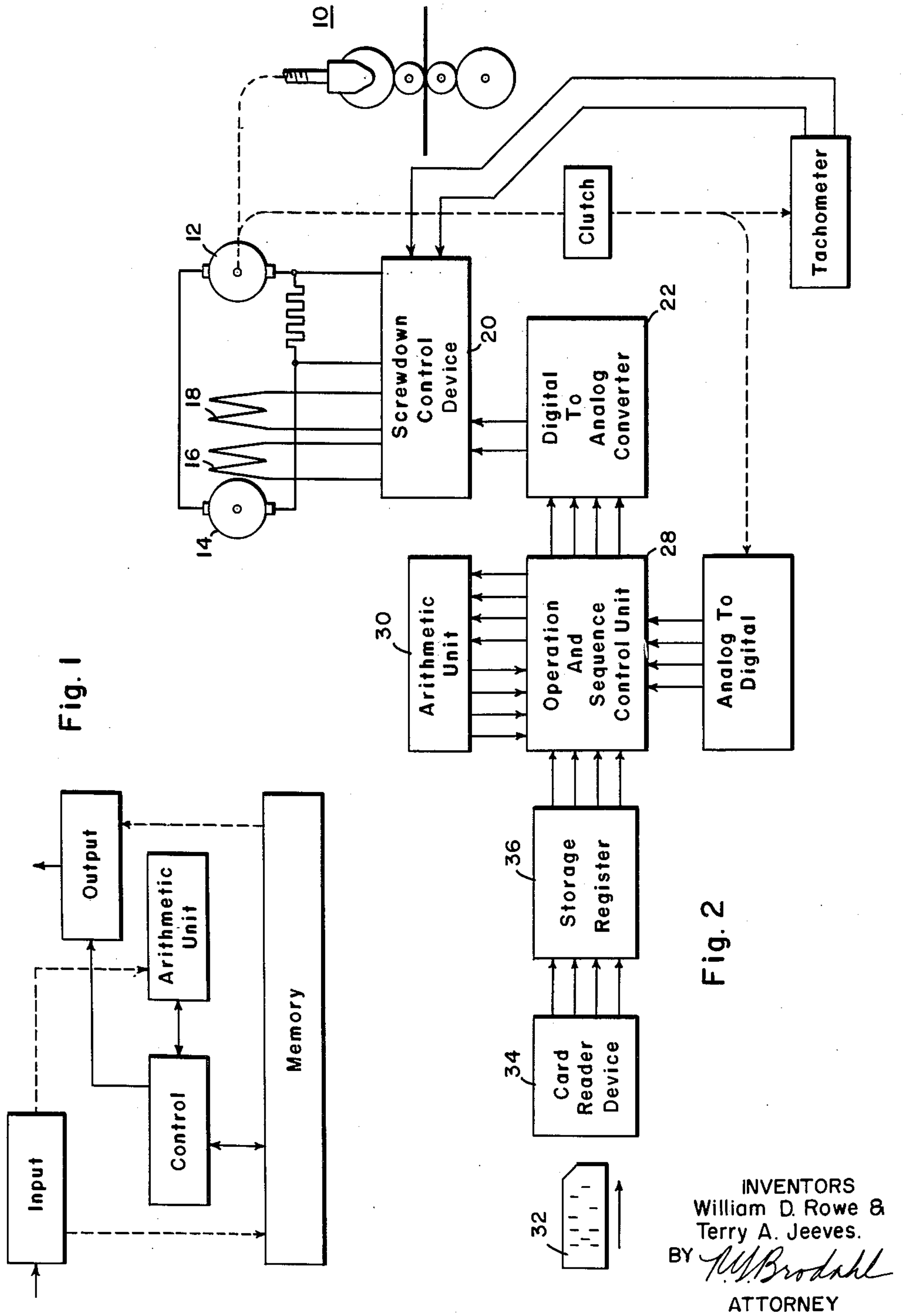
FIGURE 1 shows a diagrammatic view of one form of the electrical computer apparatus in accordance with the present invention.
FIG. 2 is an illustrative diagrammatic view of electrical computer apparatus in accordance with the present invention and applied to control the screwdown setting of a strip rolling mill in accordance with desired setting control information punched into an input card member.

The general block diagram of the computer device is shown in FIG. 1. The solid lines connected between the respective units of the computer device indicate the usual interconnection and interoperation of the respective units, whereas, the dashed lines indicate other interconnections that may be provided and may be advantageous relative to a particular industrial control application. The input and output units may be adapted to the particular control problem involved. However, the arithmetic unit and its associated control unit will be substantially the same for each application, and perhaps have different data handling ability only as required to improve the precision of the arithmetic unit and the particular instruction control unit as may be desired. However, from a functional viewpoint, the arithmetic unit and control units are the same for substantially all applications of the present computer device. In this regard, since the present computer device is basically a parallel binary device, the precision of the computer device as well known to persons skilled in this art is changed by varying the number of bits in the binary words or numbers to be handled. In this regard, a binary word or number for use with the present computer device may consist of a twenty bit number with a twenty-first bit provided to represent the sign of that number. The computer device itself is a single address type stored program computer device.

In FIG. 2 there is diagrammatically shown for purpose of illustration only, one application of the computer apparatus in accordance with the present invention that could be made, and wherein, for example, the screwdown setting of a rolling mill 10 is determined by controlling the operation of a screwdown motor 12 connected in a conventional adjustable voltage control circuit including a generator 14 having field windings 16 and 18 controlled by a screwdown control device 20 which may include a conventional magnetic amplifier control device. A digital-to-analog converter 22 is operative as presently well known in this art with predetermined control windings of the screwdown control device 20 for determining the setting of the screwdown of the rolling mill 10. The actual position or actual setting of the rolling mill 10 is sensed through a clutch member 24 operative with an analog-to-digital converter device 26 for providing a digital signal corresponding to the actual position of the screwdown setting of the rolling mill 10. This digital actual position control signal is supplied to an operation and sequence control unit 28 of the computer apparatus in accordance with the present invention, which operation and sequence control unit 28 is operative with an arithmetic unit 30. A desired or reference setting of the screwdown position of the rolling mill 10 is provided as may be predetermined and desired to a punched card member 32 operative with a card reader device 34 and a storage register 36 in the conventional manner for providing a digital reference position control signal to the operation control unit 28. The operation control unit 28 and the arithmetic unit 30 are operative to effect a subtraction and thereby to provide in a digital manner any difference or error between the reference or desired postion control signal supplied by the storage register 36 and the actual postion control signal supplied through the analog-to-digital converter 26. This difference or error control signal in digital form is supplied to the digital-to-analog converter 22 for controlling and effecting any desired change in the operation of the screwdown motor 12 as required to correct the position of the rolls of the rolling mill 10.

*Arithmetic Unit*

Figure 3:
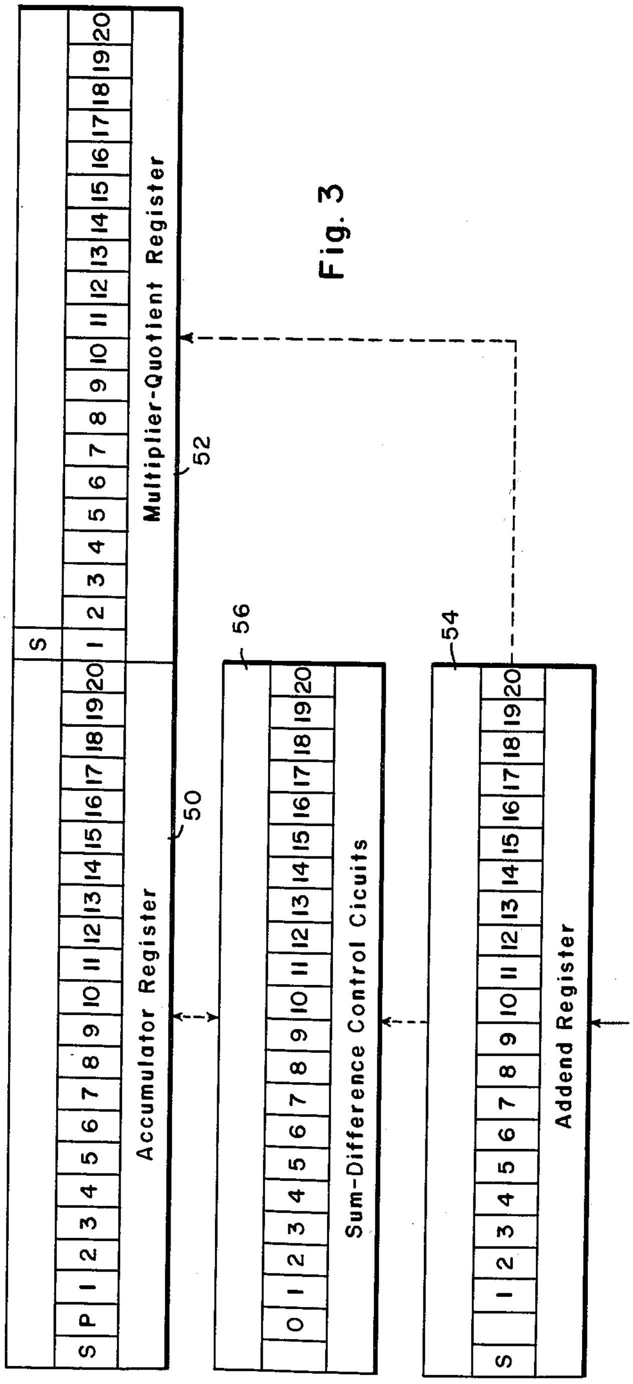
FIG. 3 is a diagrammatic showing of the addend register, the accumulator register, the multiplier and quotient register and the sum and difference control circuits of the arithmetic unit of the present electrical computer apparatus.
Figure 4:
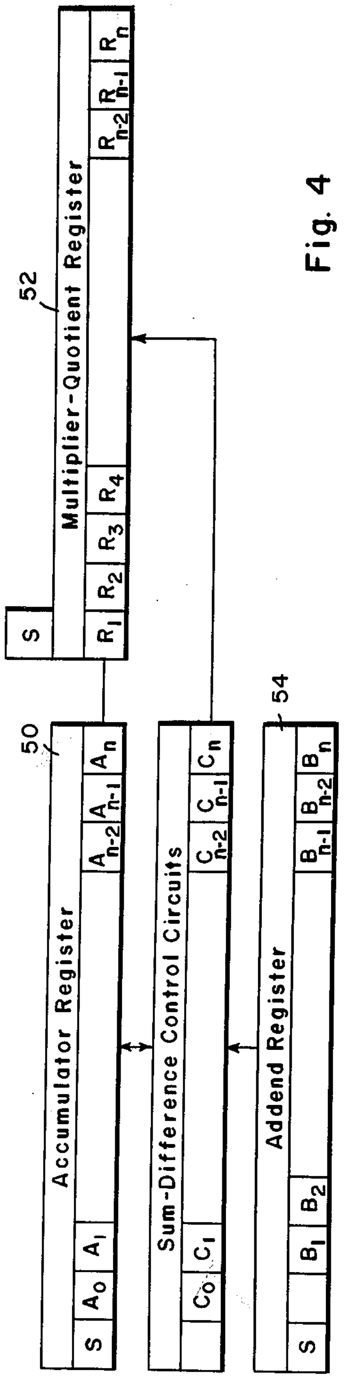
FIG. 4 is an additional showing of the arithmetic unit.

In FIGS. 3 and 4 there is shown a diagrammatic representation of the arithmetic unit which basically comprises four devices; a twenty-two bit accumulator register 50, a twenty-one bit multiplier and quotient register 52, a twenty-one bit addend register 54 and a twenty-one bit sum and difference control circuit 56. In the arithmetic unit, the process operations of addition, subtraction, multiplication and division are carried out along with several related process operations such as shifting, clearing and rounding. The multiplier and quotient register 52 is in juxtaposition relative to the accumulator register 50 so that any desired in-line shifting operation between these two registers can be done. A multiply and divide sign stage or bit for the register 52 is also included, but not in the shift line of the multiplier and quotient register 52. The addend register 54 is a twenty-one bit, parallel type register, with each of its bit stages consisting of a NOR FLIP-FLOP circuit. These FLIP-FLOP circuits act as the input buffers to the sum and difference control register 56 where the actual processes of addition and subtraction are carried out.

Figure 21A:
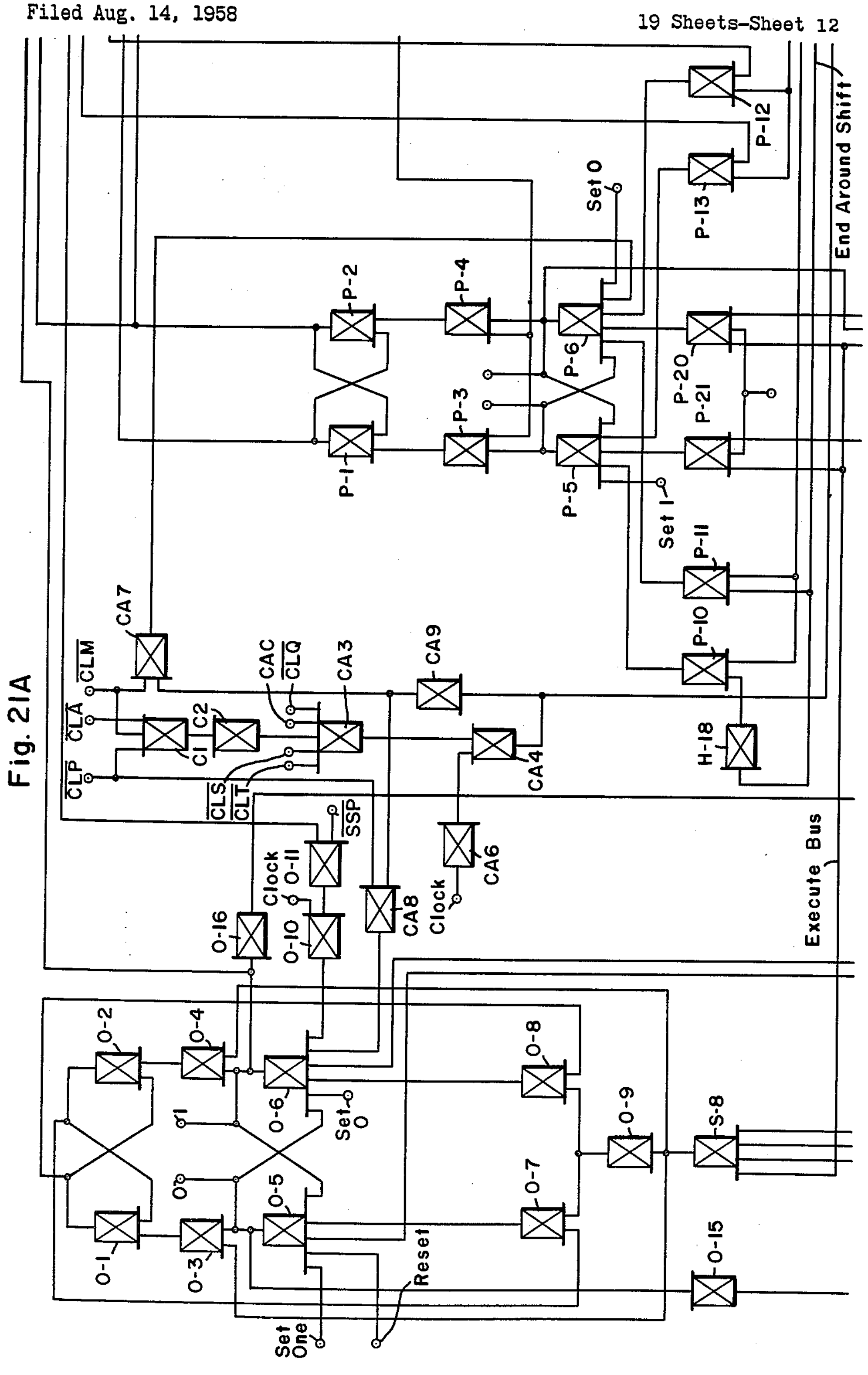
FIGS. 21A, 21B, 21C, 21D, 21E, 21F, 21G and 21H together comprise a schematic showing of the present arithmetic unit.
Figure 21B:
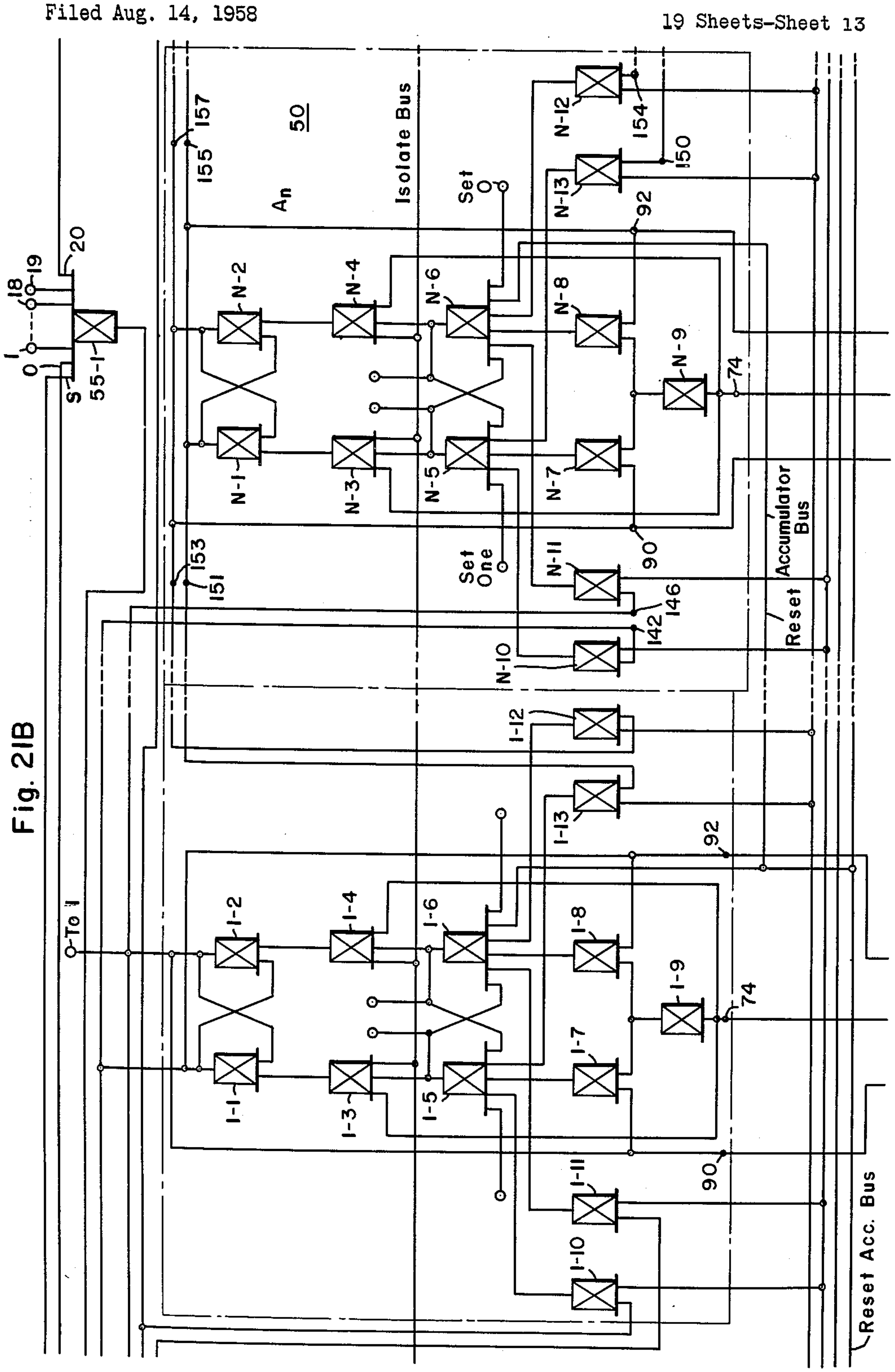
Figure 21C:
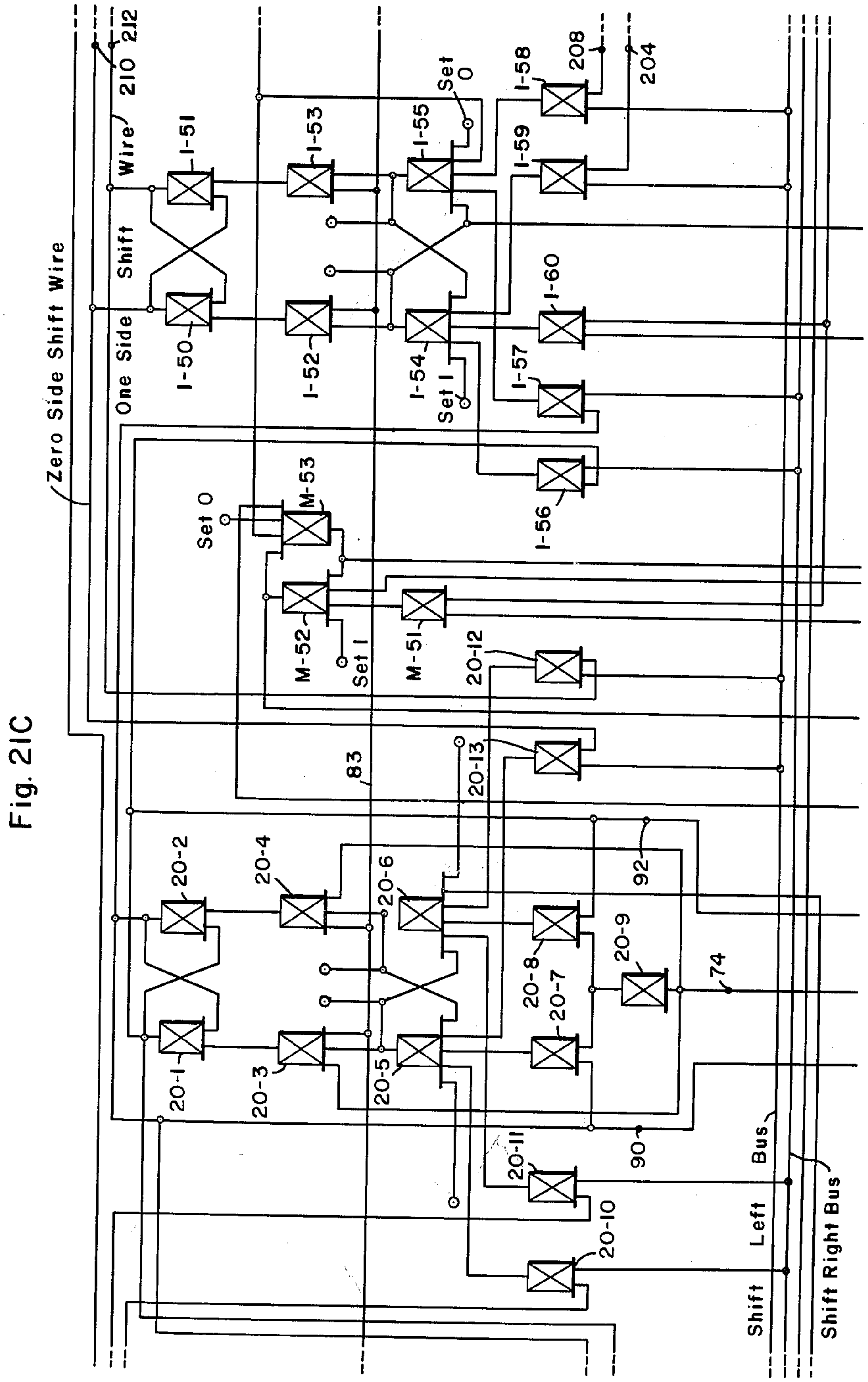
Figure 21D:
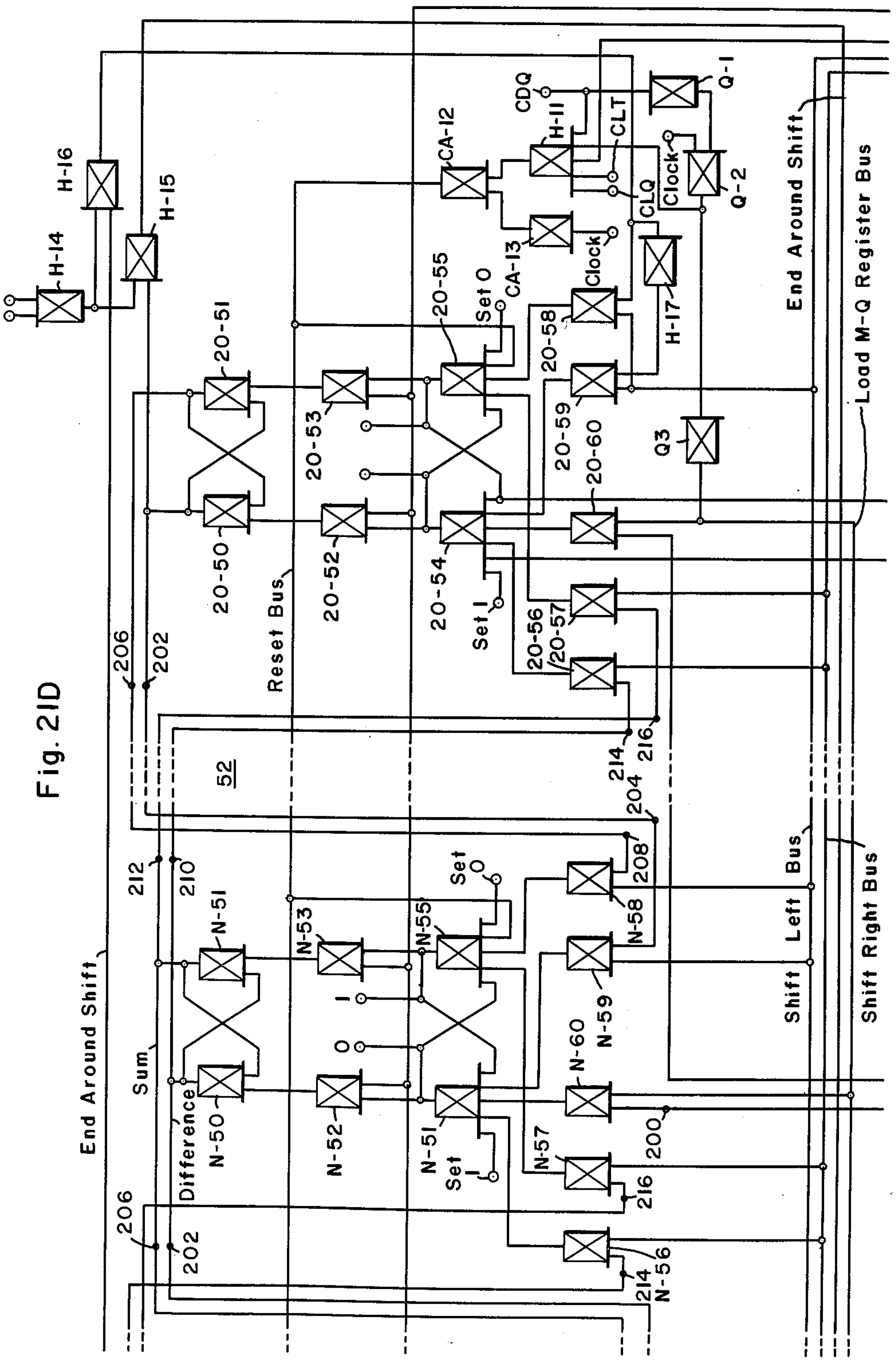
Figure 21E:
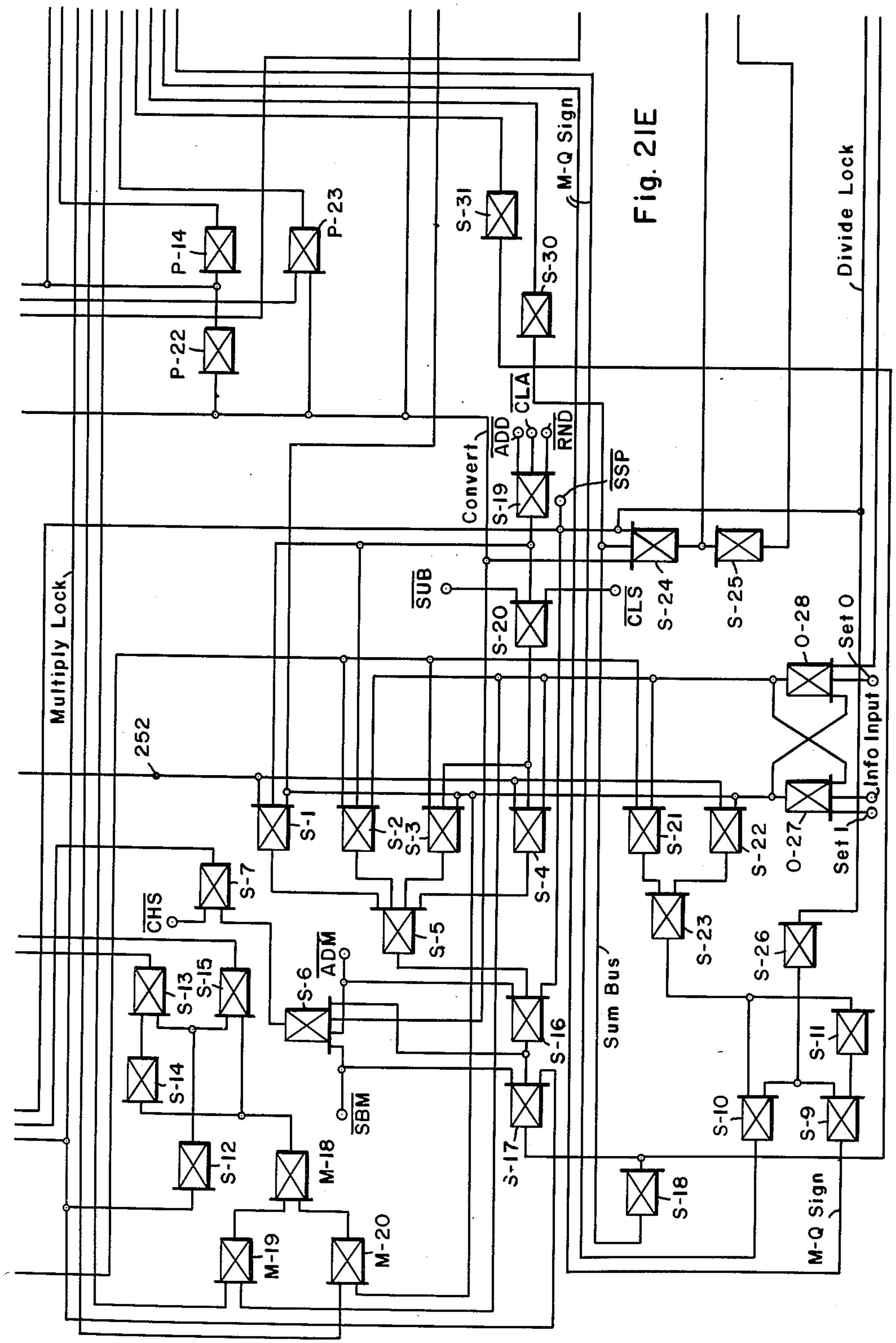
Figure 21F:
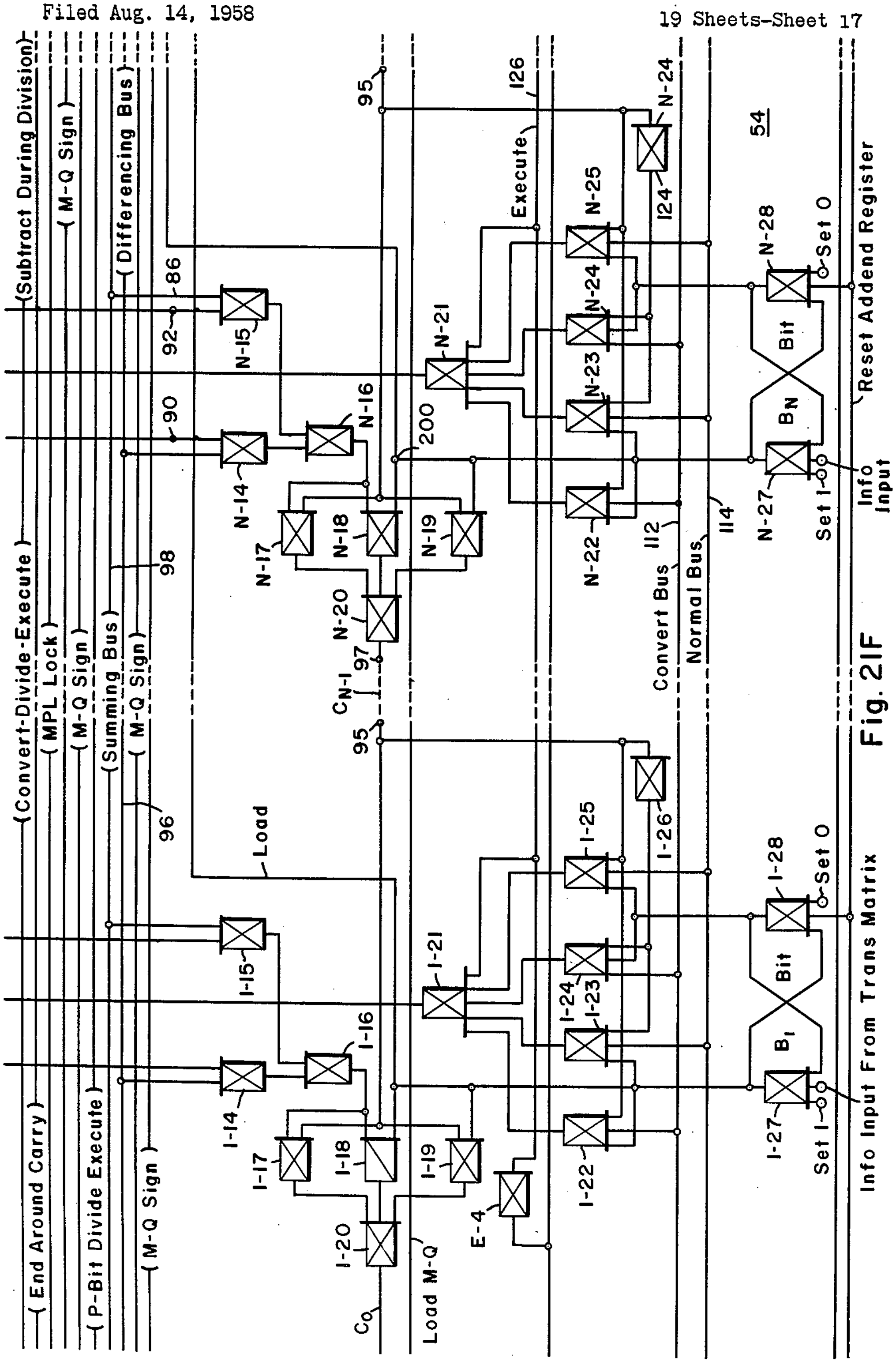
Figure 21G:
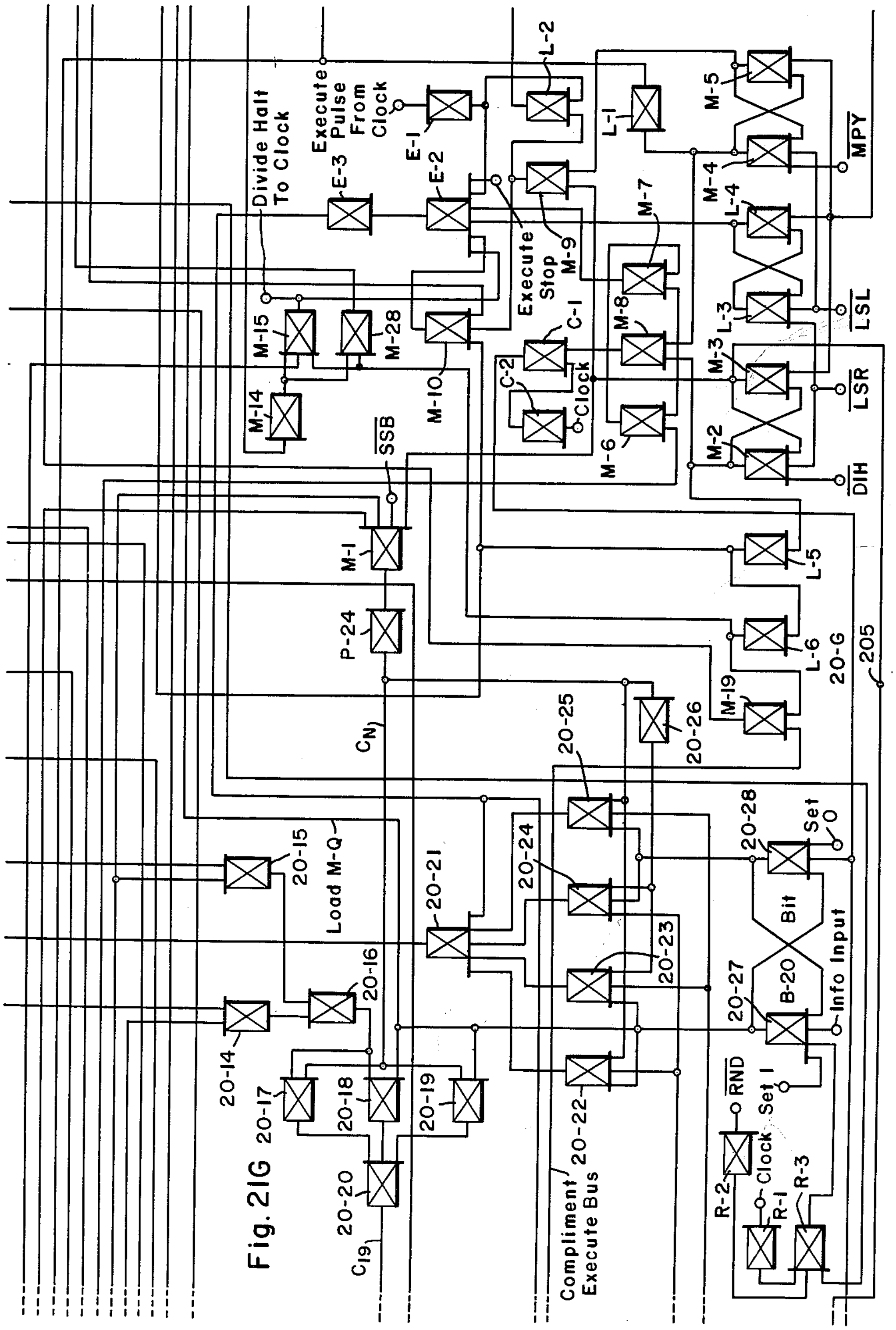

The simple FLIP-FLOP circuits of the addend register 54 as shown in FIGS. 21E, 21F and 21G are memory devices, and prior to the entrance of information into the FLIP-FLOP circuits of the addend register 54 all of the FLIP-FLOP circuits are set to their zero operating condition either by manual reset switches or by the addend reset as provided for this purpose. Then information from the storage register 36 as shown in FIG. 2 for example, and from the analog-to-digital converter device 26 or other desired input devices, is fed into the FLIP-FLOP circuits of the addend register 54 and is operative such that a one signal for a respective bit will set the respective bit FLIP-FLOP circuit to the one state and the absence of a one signal will let the respective bit FLIP-FLOP circuit remain in the zero state. In the operation of the present computer apparatus, an input number of N digits or bits can in this manner be supplied into the FLIP-FLOP circuits of the addend register 54 if desired. Relative to the showings of FIGS. 21E, 21F and 21G, the addend FLIP-FLOP circuit for the sign bit includes NOR circuits 0–27 and 0–28. The FLIP-FLOP circuit for the one bit includes NOR circuits 1–27 and 1–28, for an arbitrary N bit the NOR circuits N–27 and N–28 and for the least significant or twentieth bit the NOR circuits 20–27 and 20–28.

During the actual sum or difference operation, this input number which is stored in the addend register FLIP-FLOP memory circuits is then entered into the sum and difference control circuits 56 as shown in FIGS. 3 and 4 as addend register storage information.

Figure 7:
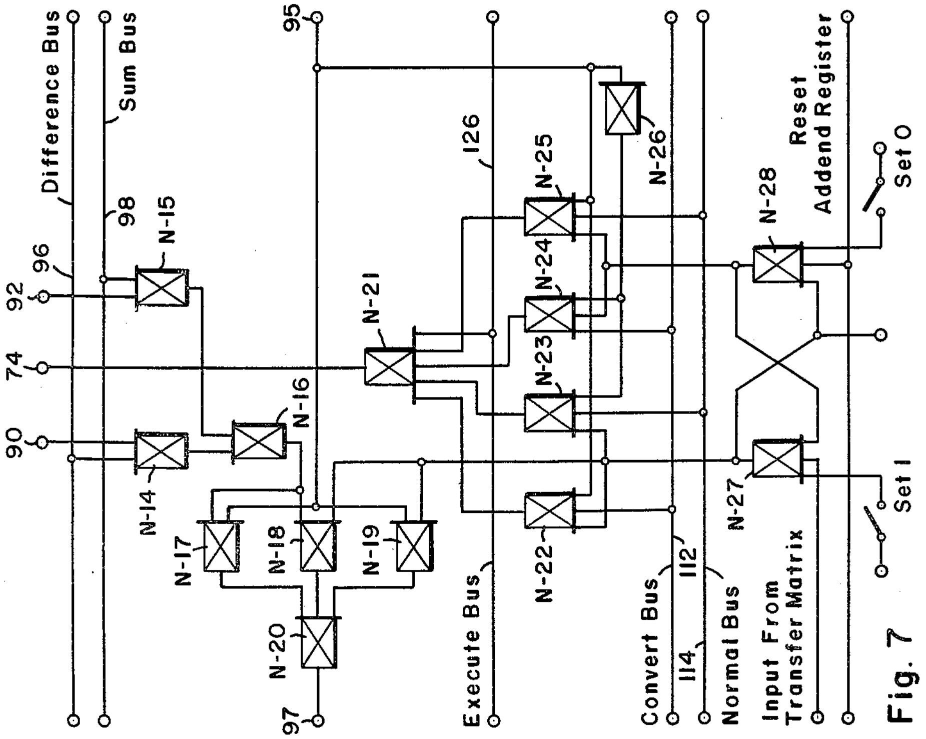
FIG. 7 is a schematic showing of the sum and difference control circuit for an individual bit N of input information.

The sum and difference control circuits of the arithmetic unit are schematically shown in FIGS. 7, 21F and 21G. FIG. 7 shows the carry signal providing circuit as including NOR circuits N–14 through N–20. FIG. 7 shows the change signal providing circuit as including NOR elements or circuits N–21 through N–26.

In the sum difference control circuits 56, as shown diagrammatically in FIG. 3, carry signals and accumulator change signals are generated. The sum difference control circuitry remains at rest after the carry signals have been so determined until an execute pulse is received from an external source such as a clock timing device to be subsequently explained. When this execute pulse is received, the accumulator register 50 and more specifically the respective binary counters of the accumulator register 50 are changed whenever the sum difference control circuits 56 applies a change signal to the accumulator to change or complement the status or information stored in the accumulator register 50.

Figure 6:
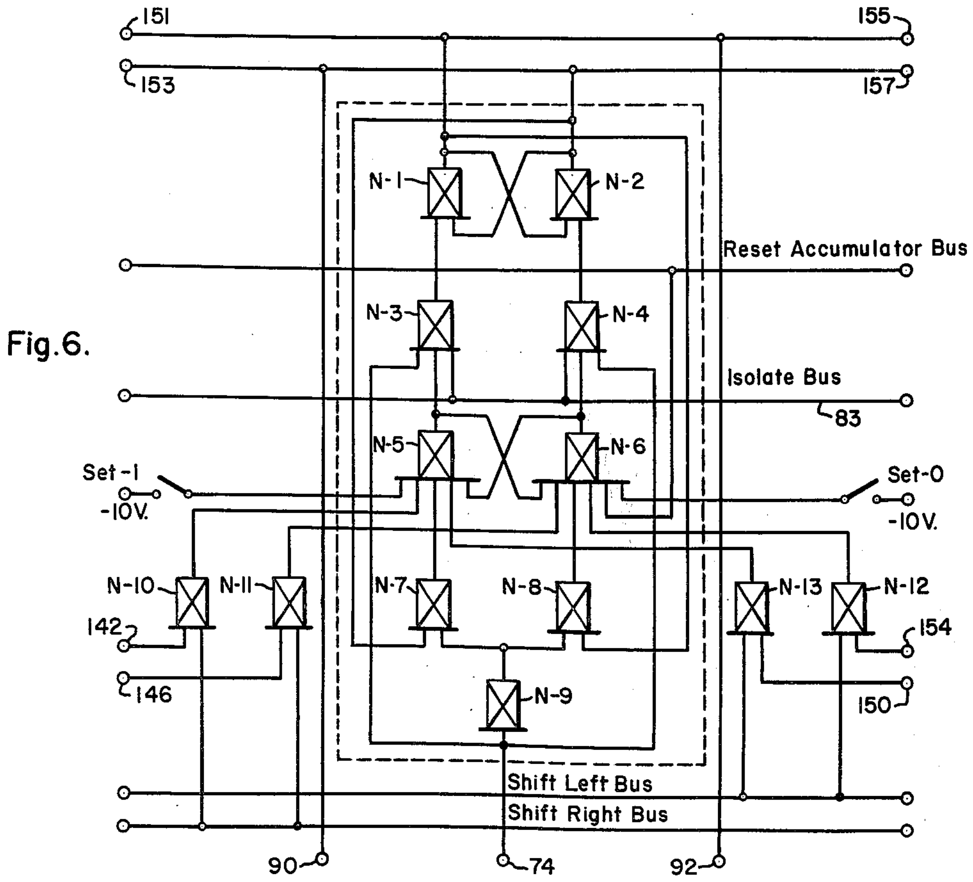
FIG. 6 is a schematic showing of a single stage of the accumulator register operative with a single bit N of input information.
Figure 20B:
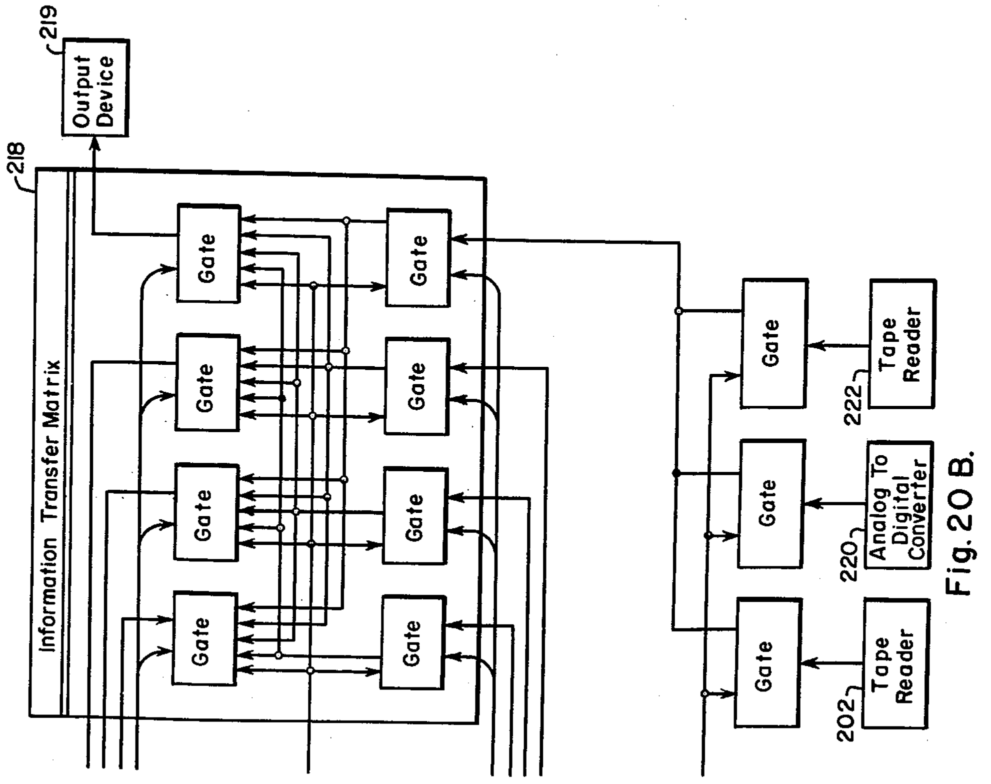
FIGS. 20A and 20B show a functional block diagram arrangement for the present computer apparatus.
Figure 20A:
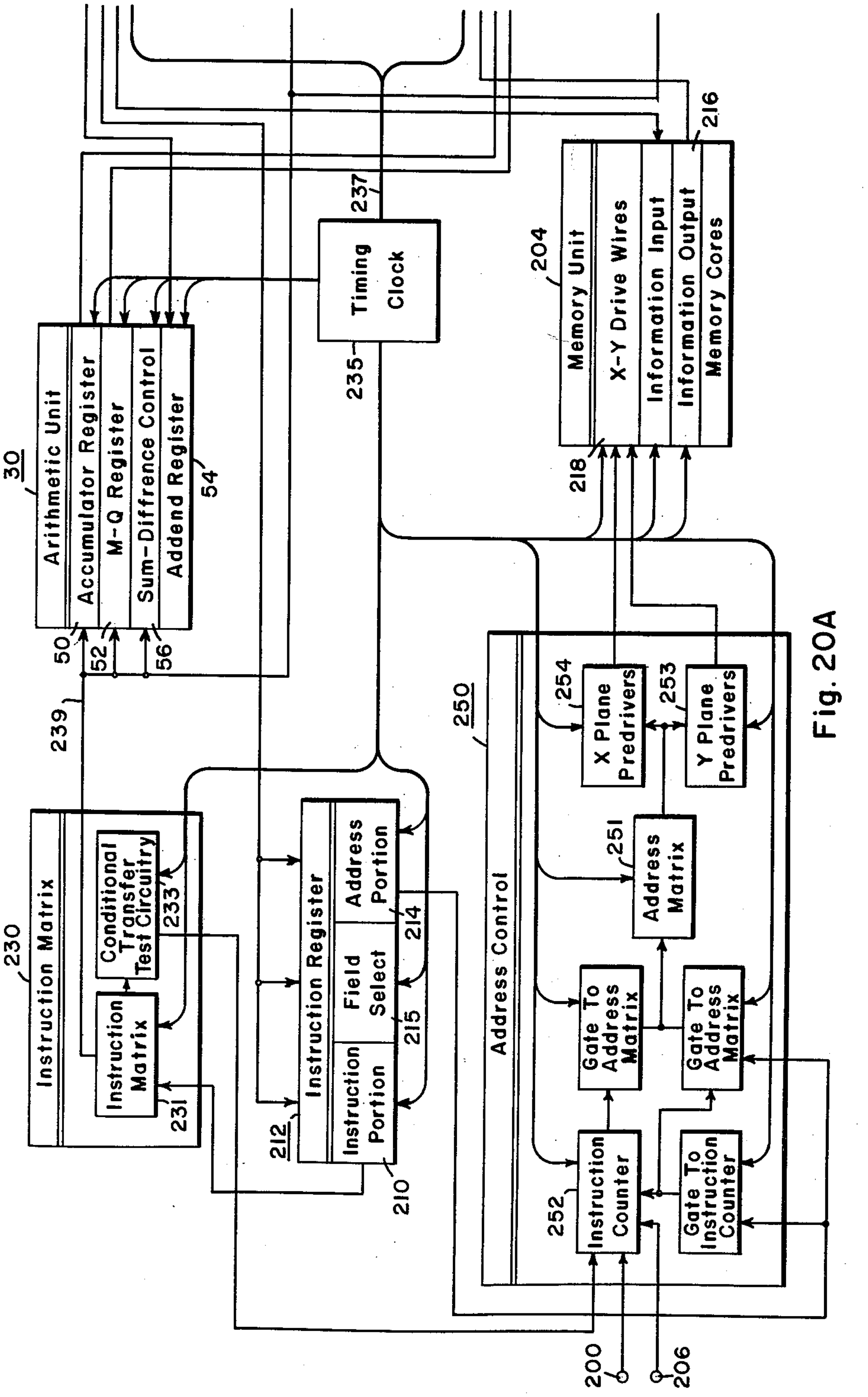

It should be here noted that the accumulator stage is schematically shown in FIG. 6. Also in FIGS. 20A, 20B and 20C illustrative accumulator stages are shown. Each such stage, as shown in FIG. 6, includes a first storage section made up of NOR circuits N–5 and N–6 and a second storage section made up of NOR circuits N–1 and N–2. The NOR circuits N–3 and N–4 isolate these storage sections, and the NOR circuits N–7, N–8 and N–9 are input control elements of the stage.

The addition and subtraction process operations are all algebraic operations and the correct sign is retained in the sign bit of the accumulator throughout the operation of the computer device as will be later explained. The carry propagation or carry signal generation proceeds in the sum difference control circuits and is completed before the actual execution of an instruction such as add or subtract. In this regard, the instruction signal from an instruction register outside of the arithmetic unit 30 is supplied to the sum difference control circuits 56 and is operative to effect the generation of the carry signals in the case of addition and the generation of borrow signals in the case of subtraction. These latter signals then determine together with the addend register whether each bit of the number stored in the accumulator register 50 is correct for the desired and resulting answer or has to be changed. After all carry signals have been generated and after these carry signals have been compared with the respective bits of the number stored in the addend register 54 to determine the change signals, then an execute pulse may be supplied as controlled by the external clock timing device and after a sufficient time period has been provided for the generation of all carry signals and all change signals as also controlled by the clock timing device. This execute pulse causes the respective bits of the number stored in the accumulator register 50 to be changed by complementing them to provide the correct number for the desired answer where any of the bits in the accumulator register 50 were previously incorrect. Since the accumulator register 50 is made up of a plurality of binary counters for each respective bit, a change by complementing for any respective bit is effected by pulsing the input of the binary counter for that bit to be changed and this is done during the execute cycle of the operation of the present computer apparatus.

More specifically, in the sum difference control circuit 56 as shown in FIG. 7 for the N bit, for example, there is provided a NOR circuit gate device N–21 which normally receives a one value signal from the execute bus 126. If the carry signal and addend register bit signal comparison is such that a change is to be made for either addition or subtraction, the output of NOR gates N–22, N–23, N–24 and N–25 will all be zero. When the execute pulse occurs, the execute bus 126 provides a zero output signal for a short predetermined time interval. Therefore, NOR gate N–21 will have a one pulse on its output since none of its inputs receive a one value signal. The one or unit value output signal from the NOR gate N–21 is fed to the input of the respective bit of the accumulator register 50 during this same execute time interval. This causes the respective N bit stored in the first or lower section of the accumulator register 50 N stage to change by complementing that bit. If, when the addend and carry signals of the particular or respective N bit involved do not require a change to occur in the accumulator register 50, one or more of the outputs of the NOR circuits N–22, N–23, N–24 and N–25 will have a one or unit value output signal which is fed to the input of the NOR gate N–21. In the latter case, during the execute time interval when the execute bus 126 goes to zero, one or more of the remaining inputs of the NOR gate N–21 will have a unit or one signal imposed upon it. Therefore, the output of the NOR gate N–21 will remain at zero value during the execute cycle and no change signal will be supplied by the NOR gate N–21 to the respective bit of the accumulator register 50 that is involved. One advantage is that carry signal propagation may occur simultaneously with other required time sequence operations such as input or output of information and storage of same and the like, to thereby shorten the required computing time since the execution time is practically instantaneous compared to the required carry propagation time.

Another advantage is that overflow comparison and improper division operations can be noted before the execution operation takes place to thereby enable the algebraic processes to be pre-examined.

The fact that we have a carry or borrow signal from the most significant bit of the sum-difference control circuits, which is the bit 1 as shown in FIG. 3 and corresponding to $2^{19}$, means that we can predict whether one number is larger than another without actually executing the add or subtract instruction. This signal may be generally termed the convert signal. More specifically, in the case of addition, if we have an overflow condition or a carry from the bit 1 corresponding to the $2^{19}$ bit as shown in FIG. 3 we would know that on the execution pulse for effecting the desried addition operation, we would lose this information. During the subtraction operation, if we have a carry signal, which in the case of subtraction is called a convert or borrow signal, this means that the number in the addend register 54 is larger than the number in the accumulator register 50. Thusly, we can compare two numbers as to size without actually making a substraction operation with the present computer apparatus. For the division operation this is an important factor in that the division operation comprises a series of subtracting operations in the present computer apparatus and it is desirable that we always divide a larger number into a smaller number to arrive at a fractional answer. In the event that the number in the addend register 54 is not in fact the larger number the absence of such a convert signal indicates an improper division operation and the probability of an incorrect answer. To avoid this, the number in the accumulator register 50 can be shifted to the right as well known in the art to make it the smaller number. The computer operation will otherwise be stopped by this improper division indication to prevent arithmetic mistakes from happening.

As previously mentioned, division comprises a series of shifting to the left operations of the number in the accumulator register 50 and conditional subtraction operations of the number in the addend register 54. Conditioned subtraction may be considered as a subtraction that is made when the number in the accumulator register 50 is as large as or larger than the number in the addend register 54; and no subtraction can otherwise be made. In making a conditional subtraction, a testing or sensing operation in effect takes place to see if, in fact, the number in the accumulator register 50 is the larger number. After the initial division becomes proper as shown by the presence of a convert signal, a shift to the left is made for each bit in the accumulator register 50, and a subtraction takes place for each bit where there is no convert signal.

In the prior art and previously known method of dividing, and after an initial inspection for proper division to make sure that the number in the accumulator register 50 is in fact less than the number in the addend register 54, a conditional subtraction is made by actually subtracting the number in the addend register 54 from the number in the accumulator register 50 and inspecting the remainder left in the accumulator register 50 to see whether it is positive or negative. If the remainder is positive, the subtraction is completed and a one or unit number is entered into the quotient register 52. If the remainder is negative, the number subtracted is added to the remainder to again arrive at the original number after said first shift left operation. Then a second shift left occurs and the process is repeated again for each bit in the accumulator register. For each shift left, where a proper subtraction occurs, a one is put into the quotient register.

In the present computer apparatus, the conditional subtraction operation is effectively accomplished in a much simpler manner. After the initial inspection for proper division has been made, a first shift left occurs. Now the number in the addend register 54 is compared with the number in the accumulator register 50 to determine whether it is larger or smaller than the number in the accumulator register 50. This comparison generates a convert signal. If a convert signal occurs, the number in the addend register 54 is larger than the number in the accumulator register 50 and therefore if a subtraction is made, the remainder in the accumulator register 50 would be negative and would require the addition of the number in the addend register back to the remainder to arrive at the original number in the accumulator register. Thusly, we do not have to actually make such a subtraction and subsequent addition operation as just described. If the convert signal is zero, a subtraction operation can be made and a one signal is entered into the quotient register 52. In other words, and during division only, the execute pulse is prevented from reaching the sum difference control circuits 56 by the presence of a one or unit value convert signal applied to NOR elements M10, E2 and E3 shown in FIG. 16 and FIG. 21G and operative to inhibit the execute pulse from the time clock such that no execution of subtraction can take place.

Stated in still another way, the convert signal controls the subtraction operation. In making a division operation, a series of shifts to the left and subtractions are made, and the initial absence of a convert signal informs that a division operation is improper and operates to halt such an operation by stopping the advancing of the time clock. However, the initial presence of a convert signal informs that a division operation can be made. A first shift left is then made and if the convert signal disappears a first subtraction is made and a one is stored in the quotient register 52. If the convert signal does not disappear after the first shift left, no subtraction can occur at this portion of the cycle because the presence of a convert signal prevents the execute pulse from effecting a subtraction operation. After either of the above situations, a second shift left occurs, then the presence of a convert signal at this time would again prevent a subtraction operation. This process is repeated only as many times as there are capacity bits in the accumulator register 50. Simultaneously, with every subtraction that does take place, a one signal is entered into the least significant bit of the quotient register 52. The quotient register 52 shifts left with the accumulator register 50 every time a shift left occurs.

*Instructions*

While the arithmetic unit as shown in FIG. 4 is designed to allow a certain amount of microprogramming, twenty-six basic instructions have been wired into the computer apparatus since less than twenty extra NOR circuits were required to do this. By microprogramming is meant programming of basic instructions together in such a way as to get a more complicated instruction. The complicated instructions then have instruction addresses in the same manner that basic instructions do. For example, division is accomplished by microprogramming, whereby shift instructions and subtract instructions are together operative to provide a division instruction. The following table lists the basic non-transfer instructions:

TABLE I

*Non-Transfer Instructions*

| Abbreviation | Instruction | Code |
|---|---|---|
| ADD | Add algebraically | +00000 |
| SUB | Subtract algebraically | −00000 |
| MPY | Multiply | +00010 |
| DIH | Divide or Halt | −00010 |
| CLA | Clear accumulator and Add | +00100 |
| CLS | Clear accumulator and Subtract | −00100 |
| ADM | Add Magnitude | +01000 |
| SBM | Subtract Magnitude | −01000 |
| RND | Round | +01010 |
| SSB | Subtract by one's complement | −01110 |
| CHS | Change sign | +01110 |
| CAC | Clear accumulator | +00001 |
| CMQ | Clear M–Q register | −00001 |
| CLT | Clear accumulator and M–Q registers | +00011 |
| HAP | Halt and Proceed | −00011 |
| ESL | End-around Shift Left | +00101 |
| ESR | End-around Shift Right | −00101 |
| SSP | Set sign plus | +00111 |
| SSM | Set sign minus | −00111 |
| SHL | Shift left | +01001 |
| SHR | Shift right | −01001 |
| LDQ | Load M–Q from addend reg | +01011 |
| CLM | Clear Magnitude | +01101 |
| CLP | Clear P-bit | −01101 |
| LSL | Long shift left (20 bits) | +01111 |
| LSR | Long shift right (20 bits) | −01111 |

The above non-transfer instructions are conventional and well-known code selection instructions already known to persons skilled in the present art.

The following table lists the basic transfer instructions:

*Transfer Instructions*

| Abbreviation | Instruction | Code |
|---|---|---|
| TZE | Transfer on Zero | +10000 |
| TRP | Transfer on Plus | +10010 |
| TRM | Transfer on Minus | −10010 |
| TRA | Unconditional Transfer | −10000 |
| TRO | Transfer on Overflow | +10011 |
| TQP | Transfer on M–Q plus | −10011 |
| HTR | Halt or Transfer | −10101 |

These similarly are conventional and well-known code transfer instructions already known to persons skilled in this art.

The basic logical requirements of all arithmetic units must be similar insofar as each of such units must reproduce the fundamental arithmetic operations required. However, there is considerable latitude of variation in the precise maner in which the logical design for each such arithmetic unit is carried out. The logical design for the present computer apparatus is based on a special logical element or component device known as the NOR element. The NOR element is a presently well-known prior art logic element which has a single output and may have several inputs. It is disclosed in copending patent application Serial No. 628,332, filed December 14, 1956, by W. D. Rowe and assigned to the same assignee as the present application.

The operation of the NOR element is such that the output is active or energized only if all of the inputs are inactive and not energized. Expressed in logical terms, the combined statement is true only when all the component statements are false. Stated in terms of everyday English, the operation of the NOR element relative to input signals $A_1$, $A_2$, and so forth through $A_n$, is such that it has an output only when neither $A_1$, $A_2$, and so forth, nor $A_n$ are energized or active. The use of the NOR element in the present computer apparatus enables greater latitude of design and versatility of the resulting computer apparatus.

In FIG. 4 there is shown a diagrammatic design of one form for the present arithmetic unit for use with binary numbers. Most analog converters presently used in industrial control applications are operative to provide binary numbers. The use of decimal numbers does not appear to be as advantageous regarding versatility, accuracy, speed and the like as the use of binary numbers. To increase the operational speed, the arithmetic unit was built to operate in the parallel mode such that additions take place relative to all bits of the numerical input information simultaneously. The limiting factor on the addition operation speed, with the parallel mode of operation, is the rate at which the carry signals can be propagated. The design shown in FIG. 4 incorporates the usual ripple propagation. Ripple propagation will occur since the carry signal of the most significant bit in the addition process will depend, in general, upon the condition of the least significant bit. In other words, the least significant bit will determine its carry signal. This carry signal will, in turn, effect the carry signal of the next bit in line which, in turn, will affect the carry signal of the next bit and so on down the line until we reach the most significant bit. The most difficult condition occurs when there is a carry signal at every stage or bit. Generally speaking, there will be bits that have either a zero or one carry signal regardless of what precedes them. This is the case where the respective bits of the accumulator and the addend registers are either both zero or both one. In this case, the carry proceeds from this point to the most significant bit or to the next bit where this condition occurs. This means that the ripple, in general, will take less time than the above-mentioned most difficult case. It should be here noted that ripple propagation in general is well known to persons skilled in the present art.

Figure 5:
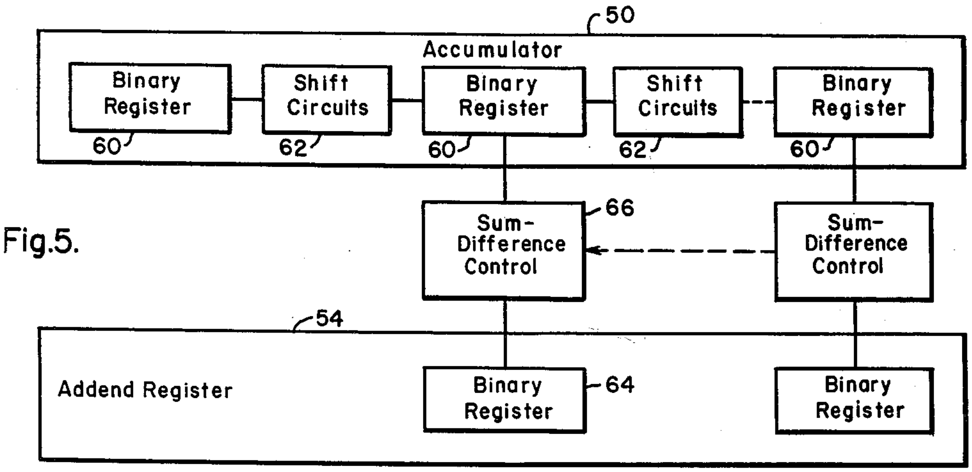
FIG. 5 is a schematic showing of a portion of the apparatus shown in FIG. 3.

The arithmetic unit is functionally shown in FIG. 5. The accumulator register 50 acts in conjunction with two other registers, the addend register 54 and the multiplier and quotient register 52 (not shown in FIG. 5) used in the multiplication and division operations. The accumulator register 50 forms either the sum or difference as required of the binary number stored in the addend register 54 and the binary number previously stored in the accumulator register 50. The resultant sum or difference number is stored in the accumulator register 50. The latter operation takes place in two steps. The first step generates appropriate carry signals which act to determine which bit stages or positions of the accumulator register have to be changed to alter the binary number in the accumulator register as desired so that the resultant number of the summing or differencing operation will appear in the accumulator register 50. The required propagation of carry signals appropriate to this latter step begins in the present arithmetic unit shown in FIG. 5 as the addend binary number is placed in the addend register 54. The second of the above steps consists of the execution operation. During the execute operation, the further propagation of carry signals is blocked. This latter feature of the present computer apparatus enables the arithmetic unit to operate asynchronously for there is no chance of interference caused by new carry signals being fed synchronously into the accumulator register 50 before the execution operation is completed.

The arithmetic unit works with signed binary numbers, that is, the binary numbers in true form with an appropriate sign included. These are the numbers ordinarily used in pencil and paper type of binary arithmetic operations. The subtraction process is based on the addition of a complement number. However, it is so set up that only the true number appears as the answer in the accumulator register 50.

*Addition and Subtraction*

The basic operation of the arithmetic unit is to perform any desired addition and subtraction operation. In keeping with conventional mathematical terminology, this arithmetic unit operation will be generally termed the addition operation. This latter term is meant to cover both the primary summing and differencing procedures from which, with the addition of appropriate sign indication circuits, both the fundamental processes of addition and subtraction may be effected.

The accumulator 50 which is basically a binary counter device is used to store the results of the addition operation. The binary number which is to be added to the binary number stored in the accumulator register 50 is held in the addend register 54. Referring to the diagrammatic showing of FIG. 4, the binary number B including a plurality of bits $B_0$, $B_1$, $B_2$, . . ., $B_{n-1}$, $B_n$ is held in the addend register 54 and is to be added to the binary number A including the plurality of bits $A_0$, $A_1$, $A_2$, . . ., $A_{n-1}$, $A_n$ stored in the accumulator register 50. The addend binary number B is not destroyed or otherwise affected by the addition operation. The resulting sum binary number S of the addition operation is again stored in the accumulator register 50.

In FIG. 5 there is functionally shown the connection of the accumulator register 50 relative to the addend register 54. The accumulator register 50 comprises a series of binary counters 60, with shift circuits 62 connected between the respective binary counters 60 of the accumulator register 50. The addend register 54 similarly comprises a series of binary registers or binary counters 64, with each binary counter 64 in the addend register being provided for one respective bit of the addend binary number B and being connected through a sum difference control and carry signal circuit 66 to the respective binary counter 60 in the accumulator register for the corresponding bit of the binary number A stored in the accumulator register 50.

In FIG. 6 there is schematically shown a binary counter for an arbitrary N bit of the binary number A stored in the accumulator register 50. The binary counter shown in FIG. 6 is similar to the binary counter covered by copending application Serial No. 672,903, filed July 19, 1957 by W. D. Rowe, entitled Binary Counter and assigned to the same assignee as is the present application.

It should be noted that modification of the binary number A stored in the accumulator register 50 occurs in two phases. In the first phase, the lower FLIP-FLOP circuit of the binary counter and including NOR elements N–5 and N–6 is changed by the application of an input signal applied to the input terminal 74 and received from a NOR element N–21 in the sum difference control as will be later described relative to the showing of FIG. 7. In the second phase, the upper FLIP-FLOP circuit including NOR elements N–1 and N–2 is changed to agree with the lower FLIP-FLOP circuit including the NOR elements N–5 and N–6, upon the release or removal of the input signal applied to the input terminal 74. Advantage is taken of this latter feature of the operation to insure that no spurious signals are generated by the carry signal circuits or other circuits which would interfere with the correct operation of the accumulator register 50. At the time of execution of the addition operation, all of the associated circuits of the sum-difference control circuits are in a state of equilibrium. During the change or execute operation, the upper FLIP-FLOP circuit including the NOR elements N–1 and N–2 is locked in its starting position such that no further change can happen in the carry circuitry because the upper FLIP-FLOP circuit including the NOR elements N–1 and N–2 does not follow the lower FLIP-FLOP circuit including the NOR elements N–5 and N–6 until the removal of the execute pulse from the isolate bus 83. During the execution operation, a change occurs only in the lower FLIP-FLOP circuit including the NOR elements N–5 and N–6 of each stage binary counter 60 of the accumulator register 50. Signals that are generated by these latter changes are blocked by the isolation stages including the NOR elements N–3 and N–4 from the remainder of the circuitry and cannot be transmitted further into the arithmetic unit. This is due to the fact that during a change or execute operation, we have an input applied to the terminal 74 and this same input signal is applied to the NOR elements N–3 and N–4 such that the outputs of the NOR elements N–3 and N–4 are zero regardless of what is put into them from the NOR elements N–5 and N–6 of the lower FLIP-FLOP circuit. In other words, the lower FLIP-FLOP circuit including the NOR elements N–5 and N–6 is now isolated from the upper FLIP-FLOP circuit including the NOR elements N–1 and N–2. When the execute pulse disappears, this removes the input pulse from the terminal 74 and removes the input pulse applied to the NOR elements N–3 and N–4 such that they are no longer isolating the lower FLIP-FLOP circuit including the NOR elements N–5 and N–6 from the upper FLIP-FLOP circuit including the NOR elements N–1 and N–2. Therefore, the upper FLIP-FLOP circuit can now follow the status of the lower FLIP-FLOP circuit.

Also, since the changes have now occurred and a new number is in the accumulator register 50, the sum-difference control circuits can now operate upon new information. These changes occur only during the execution operation, and a change is made in the respective stages only where a change is supposed to take place in accordance with the change signal information from the sum-difference control circuits. After the execution operation time period, the input FLIP-FLOP circuit including the NOR elements N–5 and N–6 is isolated by the isolation stage including the NOR elements N–3 and N–4 upon the removal of all input signals to the terminal 74. The upper FLIP-FLOP circuit including the NOR elements N–1 and N–2 is then again connected to the lower FLIP-FLOP circuit including the NOR elements N–5 and N–6. At this time, and after the completion of the execution operation, the carry circuit and associated circuitry are free to seek a new equilibrium state. However, no further changes taking place will affect the accumulator register 50 because the input isolation stage including the NOR elements N–7 and N–8 prevents any further change in the accumulator register 50.

During the non-execute portion of the operation, the arithmetic unit will accomplish transmission and generation of the carry signals. It is during this latter time period that modification of the addend register 54 may be accomplished by inserting a different addend binary number B to the binary register 54 if desired. Further, shifting to the right or left of the accumulator register 50 and the adjacent register 52 can be repeatedly performed as may be desired during this non-execute operation time period.

The shifting operation does not require the carry circuit as shown in FIG. 7 and including the NOR elements N–14, N–15, N–16, N–17, N–18, N–19 and N–20 and therefore, repeated shifts either right or left can be accomplished without waiting for the carry signals to be correctly generated. Thusly, shifting of the accumulator register 50 as well as modification of the binary number B stored in the addend register 54 can be simultaneously performed if desired. The non-execute operation time period must be long enough to permit the changes produced by shifting or by the modification of the addend register to generate and propagate the required carry signals through the remainder of the circuits, however. This time period is limited only by the operation time of the NOR circuits and no artificial time delay elements are provided. The execute portion of the operating cycle need only be long enough to permit the proper input signals to be applied to the binary counter 60 of the accumulator register 50, as previously explained.

During the non-execute portion of the addition operation cycle, the carry signal and associated circuitry shown in FIG. 7 determines what changes in the accumulator register 50 are necessary to modify the binary number A already present in the accumulator register 50 such that a resultant and answer binary number will be present and represent the desired combination of the binary number A previously stored in the accumulator register 50 and the binary number B stored in the addend register 54. During the execute portion of the operation cycle, these changes are made in the lower FLIP-FLOP circuit including the NOR elements N–5 and N–6 shown in FIG. 6 of each binary counter stage 60 in the accumultor register 50. During the execute portion of the operation cycle, these changes are not made in the upper FLIP-FLOP circuit including the NOR elements N–1 and N–2 and which upper FLIP-FLOP circuit drives the carry circuitry shown in FIG. 7. The change in the upper FLIP-FLOP circuit is made only after the end of the execute cycle of the operation. This is to prevent the change signal operation from interfering with the carry signal operation as previously set forth.

To facilitate the following description of the operation of the computer apparatus in accordance with the present invention, the generation of carry signals is described separately from the generation of accumulator change signals. Actually, both the generation of carry signals and the generation of accumulator change signals occur simultaneously, with the accumulator change signals being the end result. The carry signals as such only have significance as an intermediate operation to determine the accumulator change signals.

*The Summing Operation*

In the following description of the summing operation of the present computer apparatus, the binary number stored in the accumulator register 50 will be denoted as $A=A_0, A_1, A_2, \ldots, A_n$, where $A_1, \ldots, A_n$ are the respective bits or digits of the number in binary notation and $A_0$ is the special P-bit to be discussed later in conjunction with multiplication and division operations. The binary number stored in the addend register 54 will be similarly denoted by $B=B_1, B_2, \ldots, B_n$. The carry signals generated by the above two numbers will be similarly denoted by $C=C_0, C_1, C_2, \ldots, C_n$. As is the customary practice in binary notation, each bit of the above numbers have only the values 0 or 1.

The following carry signal generation rule is operative to control the summing operation. For a digit or bit X for any one of the digits 1, 2, . . . , $n$, then the carry signal $C_{X-1}=1$, if at least two of $C_X$, $B_X$ and $A_X$ have the value one; and $C_{X-1}=0$, if not more than one of $C_X$, $B_X$ and $A_X$ have the value one; and $C_n=0$. During the differencing operation $C_n=C_0$. Note that in normal operation, $C_0=0$. During the summing operation, $C_0=1$ only if the answer is too large for the capacity of the accumulator register 50; that is, when an overflow condition occurs.

The set of carry signals thusly generated together with the digits of the binary number B stored in the addend register 54 gives sufficient information to determine whether the respective digits of the number A now in the accumulator register 50 are the same or different from those which would reflect the result of the addition process. This gives the changes necessary in the accumulator register 50.

Let D include the plurality of digits $D_1, D_2, \ldots, D_n$, and represent the set of accumulator change signals. Let $D_X=1$ if a change is necessary and $D_X=0$ if no change is necessary in the $A_X$ bit of the binary number stored in the accumulator register 50. Then, the rule for generating change signals would be for any bit X that could be by any one of digits 1, 2, . . . , $n$; $D_X=0$ if $B_X$ and $C_X$ are either both zero or both one; and $D_X=1$ if $B_X$ and $C_X$ are neither both zero nor both one. In this regard, and as previously explained, the set of numbers $D_1, D_2, \ldots, D_n$ are generated during the non-execute portion of the operating cycle of the computer device. During the execute portion of the operation cycle they operate to form a new accumulator binary number stored in the accumulator register 50 which new accumulator binary number may be represented as A* including the plurality of digits $A^*_0, A^*_1, A^*_2, \ldots, A_n$. The governing rule for the result of the addition operation for any digit X that could be any one of bit 1, 2, . . . , $n$ is the following: $A^*_X=A_X$ if $D_X=0$. $A^*_X$=the complement of $A_X$ if $D_X=1$ for the P-bit $A^*_0=A_0$. It should perhaps here be noted that the complement of a given bit of a binary number is such that if the number is one, the complement is zero and if the number bit is zero, the complement is one.

As long as $C_0=0$, the binary number A* in the accumulator register 50 will correctly represent the sum of the binary numbers A and B. If, however, $C_0$ is 1, indicating an overflow condition, the value of A* will be too small by $2^n$. Since there is an overflow bit in the accumulator, namely, the P-bit, overflow information can be retained. That is, if $C_0$ is 1, which indicates an overflow condition, when the execute portion of the cycle occurs, a one is put in the P-bit and the correct number is, of course, still in the accumulator. However, a P-bit represents the $2^n$ position. Therefore, unless this P-bit is retained, that is, the overflow, the value of A* will be too small by $2^n$ or the information stored in the P-bit.

A reference here to the showing of FIG. 21 may be helpful in better understanding the above described operation. The accumulator register 50 is seen to include a plurality of twenty stages, each including the circuit arrangement shown in FIG. 6. The P-bit stage is generally similar and includes the NOR circuits P–1, P–2, P–3, P–4, P–5 and P–6 in this regard. The addend register 54 also includes a plurality of twenty stages, each being a simple FLIP-FLOP having two NOR circuits. The carry signal providing circuits and change signal providing circuits are shown connected between the respective digit stages of the addend register 54 and the accumulator register 50. In FIG. 7 there is a showing of one illustrative addend register stage including NOR circuits N–27 and N–28 and the carry signal and change signal providing circuits operative therewith.

The addition operation will be further illustrated by the simple example of adding the number five to the number three to equal the number eight. Assume that the binary form of an illustrative four digit only binary number five which is 0101 is stored in the accumulator register 50 and the four digit only binary number three which in binary form is 0011 is stored in the addend register 54. Counting the P-bit there is stored in the accumulator register the binary number $A$=00101; and stored in the addend register 54 the binary number 0011; and the generated carry signals are $C$=01110. The one in each of the least significant or right-most stage of each of the accumulator register 50 and the addend register 54, namely, the $A_n$ stage of the accumulator register 50 and the $B_n$ stage of the addend register 54 cause the generation of a carry signal for the next adjacent stage of the accumulator register 50 or stage $A_{n-1}$. The binary one signal in the $B_{n-1}$ stage of the addend register, in combination with the one value $C_{n-1}$ carry signal already generated in the $A_{n-1}$ stage of the accumulator register combine to generate a one value carry signal $C_{n-2}$ for the $A_{n-2}$ stage of the accumulator register 50. This latter carry signal $C_{n-2}$ and the one signal in the $A_{n-2}$ stage of the accumulator register 50 combine to generate a one value carry signal $C_{n-3}$ for the $A_{n-3}$ stage of the accumulator register 50. This latter carry signal, since there is not a one signal stored in the $A_{n-3}$ stage of the accumulator register 50 and further since there is not a one signal stored in the $B_{n-3}$ stage of the addend register 54, does not generate a one value carry signal $C_{n-4}$ for the $A_{n-4}$ stage of the accumulator register 50.

In this regard, a carry signal is generated in the $A_0$ or P-bit stage of the accumulator register 50 only when the capacity of the accumulator register 50 is exceeded in forming the sum of the number A stored in the accumulator register 50 and the number B stored in the addend register 54 during the addition operation and which provides an overflow condition. For the four bit binary number A stored in, for example, a four stage accumulator register 50, this occurs only when the resulting sum binary number exceeds fifteen, in that, fifteen in binary form is 1111 and can be stored in four bit stages without overflow.

At any stage or bit position where more than one unit or one value signal occurs in one of the three locations, that of the addend register, the incoming carry signal and the accumulator register, a one carry signal will be carried to the next stage or bit position. Under all other conditions, a zero carry signal is generated to the next stage or bit position. When a carry signal $C_0$ is generated into stage $A_0$ or P-bit of the accumulator register 50 this latter carry signal $C_0$ can be used to operate overflow circuitry as will be described in greater detail later in the present specification and, in particular, relative to the multiplication and division operations of the present computer apparatus.

In the circuitry shown in FIG. 7, the change signals are determined for both summing and differencing by the four NOR circuits N–22, N–23, N–24 and N–25 in the sum-difference control. Two of these NOR circuits N–23 and N–25 are used for addition and normal subtraction, and two NOR circuits N–22 and N–24 for subtraction of larger numbers from smaller numbers.

The determination of accumulator changes by the above rule in this regard provides for the change signal D the value of 1101. The addend binary number $B$=0011 and the generated carry signals $C$=01110, thusly, the accumulator change signals $D$=1101. In this regard, it should be noted that relative to the least significant or $B_n$ bit stage of each of the addend signal B and the carry signal C, the $B_n$ and $C_n$ bits are not both zero nor both one and therefore, the accumulator change signal D for the $D_n$ bit has the value one. For the addend $B_{n-1}$ bit and the carry number $C_{n-1}$ bit, both are one and therefore, the $D_{n-1}$ bit of the accumulator change signal D is zero. For the $B_{n-2}$ bit of the addend and the $C_{n-2}$ bit of the carry number, they are not both zero and not both one and therefore, the $D_{n-2}$ bit of the accumulator change signal D is one. Similarly, for the $B_{n-3}$ bit of the addend signal B and the $C_{n-3}$ bit of the carry signal C, the latter situation is also the same such that the accumulator change signal D has a one for the $D_{n-3}$ bit.

The accumulator change signal D will effect, during the execute cycle of operation of the computer device, the desired resultant or sum binary number in the accumulator register 50 in the following manner. The original binary number stored in the accumulator register 50 was $A$=00101 which corresponds in binary form to the number five initially stored in the accumulator register 50. The accumulator change signal D as above determined was 1101.

The resultant or summation binary number A* in the accumulator register 50 is determined by the rule for the result of summing in the following manner. The resultant number least significant bit or $A^*_n$ bit is zero, the complement of the initial $A_n$ bit since the $D_n$ bit of the accumulator change D is one. The $A^*_{n-1}$ bit of the sum corresponds to the original $A_{n-1}$ bit or zero since the $D_n$ bit is zero. The $A^*_{n-2}$ bit of the sum is zero which is the complement of the original $A_{n-2}$ bit since the $D_{n-2}$ bit is one. The $A^*_{n-3}$ bit is one, the complement of the initial $A_{n-3}$ zero bit stored in the accumulator register 50, since the change signal $D_{n-3}$ bit is one. Thusly, the resultant or sum binary number A* now stored in the accumulator register 50 is 01000 corresponding in binary form to eight the correct answer of five plus three.

The previous example can perhaps be better shown by the following chart arrangement:

| | |
|---|---|
| Accumulator | $A$ =00101 |
| Addend | $B$ =0011 |
| Carries | $C$ =01110 |
| Changes | $D$ =1101 |
| Resultant or Sum | $A^*$=01000 |

For comparison, as compared to the previous example, the operation of adding three plus five is illustrated in the following chart:

| | |
|---|---|
| Accumulator | $A$ =00011 |
| Addend | $B$ =00101 |
| Carries | $C$ =01110 |
| Changes | $D$ =1011 |
| Result or Sum | $A^*$=01000 |

The same result is obtained from the same carry signals, however, since the accumulator binary number A initially stored in the accumulator register 50 was different in the second example, it necessitated the generation of different change signals D.

To illustrate an overflow operation, the following example is given to illustrate the addition operation of ten plus seven which equals seventeen and exceeds the capacity of the four bit or four stages of the simplified accumulator chosen for the purpose of example only. The table illustrates the addition of ten plus seven:

| | |
|---|---|
| Accumulator | $A$ =1010 |
| Addend | $B$ =0111 |
| Carries | $C$ =11100 |
| Changes | $D$ =1011 |
| Result | $A^*$=0001 |

The result is too small by sixteen. If desired, an indication of an overflow occurring can be provided by using a P-bit stage in the accumulator. In the latter case the zero or least significant stage carry signal is not required and an overflow is indicated by the placing of a one into the P-bit stage. The changes shown complete all the four changes in the four stage example accumulator. However, if there is a P-bit register, it could be set to the "one" position by the signal from $C_0$ or the most significant carry signal stage during the execute portion of the cycle. In practice, this is what is actually done in the present computer apparatus; under these conditions, there would be no change signal relative to the P-bit so the result would now be $A$=10001 which is the exact number due to the overflow one being transferred to the P-bit during execute cycle.

It should be noted here that the P-bit register is simply a memory register which is in the shift circuitry of the accumulator. During an execute cycle if there is overflow, a one signal will be put into the P-bit. However, if there is no overflow a zero signal is always entered into the P-bit. As an example of the latter procedure using the P-bit stage consider again ten plus seven.

| | |
|---|---|
| Accumulator | $A$ =01010 |
| Addend | $B$ =0111 |
| Carries | $C$ =11100 |
| Changes | $D$ =1011 |
| Result (If P-bit is retained) | $A^*$=10001 |

*Differencing Operation*

The present computer device performs the differencing operation, by effecting the addition of the complement of a number with another number and is operative to provide the magnitude of the difference between the magnitudes of the respective numbers. One of the binary numbers to be operated on appears in the accumulator register 50 and the other binary number appears in the addend register 54. Negative numbers are represented in the arithmetic unit as signed magnitudes such that all binary numbers appear in true form and an indication is given of the sign of the number. A "one" in the sign bit represents a minus sign and a "zero" represents a plus sign.

Figure 10:
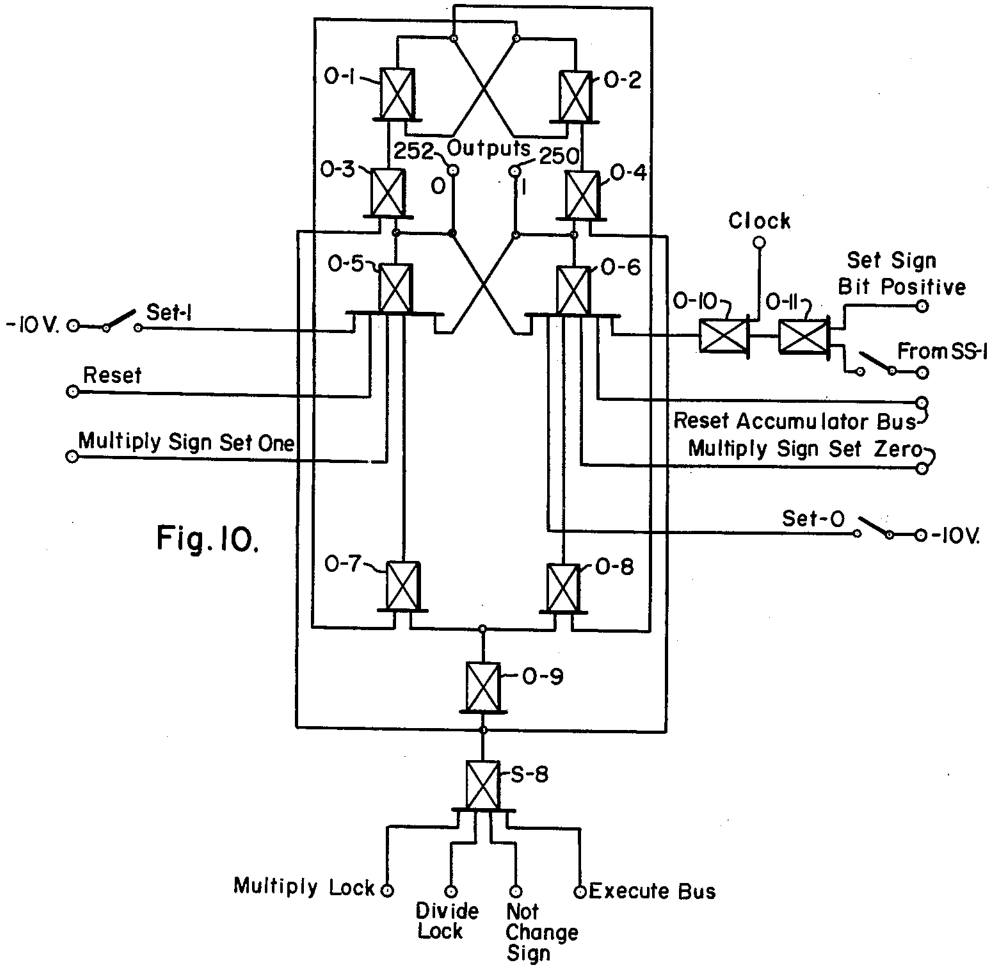
FIG. 10 is a schematic showing of the sign bit determining circuit for the accumulator.

The accumulator sign bit is shown in FIG. 10 and also in the schematic showing of the arithmetic unit in FIG. 21, and more specifically in FIG. 21A. The sign bit stage includes NOR circuits 0–1, 0–2, and so forth through 0–11.

The differencing operation is accomplished with the present computer device not by constructing a special subtracting circuit arrangement but by modifying the above and previously described addition circuitry. Effectively, subtraction is accomplished by the addition of the complement of one of the numbers relative to the other number. This is accomplished by simply switching the outputs of the accumulator register 50 to the carry circuitry when subtraction is desired. The complementing is accomplished by taking the accumulator information from the opposite side of the accumulator register. Since in a FLIP-FLOP when a number occurs from one output, its complement is also available from the other output, so it is very simple to get the complement by simply switching the output lead of the accumulator from the signal side of the accumulator to the complement side of the accumulator stage. This is accomplished by the two NOR circuits N–14 and N–15 shown in FIG. 7 with the gating sum and difference buses 96 and 98 which are each normally energized with a one value signal.

You will note that since there is a negation involved in using NOR circuits the true signal of the accumulator is in practice taken from the complement side of the upper FLIP-FLOP and the complement signal is taken from the true signal side. This effectively allows true representation and information without the need of extra negating circuits as required in prior art computer apparatus. The two input NOR circuit N–16 to which the two gating circuits N–14 and N–15 feed is simply an OR gate in operation to allow the correct signal to appear into the carry circuitry. The binary number A stored in the accumulator register 50 is not changed by this switching operation and the eventual changes will be made by the change signals D in the number in the accumulator register 50 and not in the complement of this number. When the information is read from the opposite side of the accumulator no change is made by this reading operation per se in any of the information that is actually present in the accumulator 50. However, later when changes take place in the accumulator during the execution cycle due to the change signals D, the changes will be made with respect to the true number in the accumulator but not the complement of this number. Since this complement is obtained by taking the negation of the accumulator, it is the one's complement.

However, for true subtraction the two's complement is required. Therefore, an end-around carry feature is necessary to, in effect, provide the two's complement from the one's complement as presently known in this art.

The carry technique used during the differencing operation is frequently termed end-around carry, since then $C_n$ will equal $C_0$.

Note that carry signal propagation cannot continue indefinitely despite the fact that $C_n$ is set equal to $C_0$. This is well known in this art. In fact, the carry signals will only propagate once around the accumulator register 50. This point can be realized by considering the following situation. Firstly, for any carry signals to be generated at all, there must be some bits or digits which have both $\bar{A}_X=1$ and $B_X=1$. If this were not so, no carry signal generation operation is initiated. Call such a bit stage the carry signal generation initiating stage. Secondly, despite end-around carry signal operation, no new carry signals can be generated past this initiating stage for at this stage a carry signal has already been generated.

An overflow carry in subtraction is called a borrow. The borrow signal is fed into the least significant bit stage $C_n$ of the sum-difference circuitry. Note that the borrow signal is taken in the exact manner as the carry signal.

There is no difference between the borrow signal and carry signal except in the method in which the numbers are presented. In the case of subtraction the number presented to the carry circuitry is already complemented. Therefore, the number that appears is the borrow signal. The previously described end-around carry operation is also employed.

As a general rule for determining the accumulator output for the bit or stage X which equals any one of the plurality of stages 1, 2, . . . , $n$; $A_X$ is used for summing, and the complement of $A_X$ is used for differencing. If A the binary number stored in the accumulator register 50 is greater than or equal to B, the binary number stored in the addend register 54, then the fact that the above modification will accomplish differencing is readily apparent from the fact that $\bar{A}$, the complement of A, is $(2^n-1)-A$. Hence, the changes generated are those appropriate to $\bar{A}+B$ or $(2^n-1)-(A-B)$. These changes are applied to A, yielding the complement of $\bar{A}+B$ or $A-B$.

However, if the number A stored in the accumulator register 50 is less than the number B stored in the addend register 54, then $A-B$ will be less than zero such that $\bar{A}+B$ will result in an overflow condition and the changes generated will be those appropriate to the generation of $B-A$ instead of $\bar{A}+B$. Notice that $B-A$ is smaller than $\bar{A}+B$ by the quantity $(2^n-1)$. If these changes were applied to A, the complement result would be obtained, and in order to obtain the result in a desired form, the complement of it, namely, the result would have to be taken.

The present computer apparatus accomplishes the above differencing process by converting the changes to the complement form, denoting the final changes by $F=(F_1, F_2, \ldots, F_n)$. Thusly, the rule for generating changes for the stage or bit X that can be any one of 1, 2, . . ., $n$ is the following. During the summing operation the final change $F_X=D_X$, the original change for the differencing operation $F_X=D_X$ if $C_n=0$, and $F_X$=the complement of $D_X$ if $C_n=1$. Thusly, the rule for the resultant or answer binary number in either the summing or differencing operation is the following:

$A^*_X=A_X$ if $F_X=0$ $A^*_X$=the complement of $A_X$ if $F_X=1$ $A^*_0=A_0$

For example, consider the difference operation of five and three in contrast to the previously given example of the summing operation of five and three. The accumulator output is indicated on a separate line.

| | Summing | Differencing |
|---|---|---|
| Accumulator | $A$=0101 | $A$=0101 |
| Output | $A$=0101 | $\bar{A}$=1010 |
| Addend | $B$=0011 | $B$=0011 |
| Carries | $C$=01110 | $C$=00100 |
| Changes | $D=F$=1101 | $D=F$=0111 |
| Result | $A^*$=01000 | $A^*$=00010 |

As another example consider the difference of five and five:

| | |
|---|---|
| Accumulator | $A$=00101 |
| Output | $\bar{A}$=1010 |
| Addend | $B$=0101 |
| Carries | $C$=00000 |
| Changes | $F=D$=0101 |
| Result | $A^*$=00000 |

As a still further example, consider the difference of three minus five which equals two:

| | |
|---|---|
| Accumulator | $A$=00011 |
| Output | $\bar{A}$=1100 |
| Addend | $B$=0101 |
| Carries | $C$=11011 |
| Changes | $D$=1110 |
| Complement changes | $F$=0001 |
| Result | $A^*$=00010 |

Actually the change signal is D, and the above illustrative signal F is for the purpose of explaining the operation. Notice that since the last carry signal is one, the changes are the complement of those given in the summing operation.

In FIG. 7 there is schematically shown the circuitry employed to control the summing and differencing operation for stage N of the present computer device. The terminal 74 is the input terminal of the accumulator stage N shown in FIG. 6 and is connected to receive the output signal of the change circuitry carrying the change signals F from the NOR element N–21. The terminal 90 leading to the NOR element N–14 is connected to the output terminals of the accumulator stage N shown in FIG. 6 and is connected to the output of the NOR element N–2 shown in the accumulator stage of FIG. 6. The terminal 92 leading to the NOR element N–15 is the output terminal of the accumulator stage N shown in FIG. 6 and connected to the output of the NOR element N–1. The output of the NOR element N–16 shown in FIG. 7 is the accumulator output signal in the above tables. The NOR elements N–14 and N–15 are operative as a switching circuit under the control of the differencing control bus 96 and the summing control bus 98. These buses carry control signals to indicate whether a summing operation is to be performed or a differencing operation is to be performed. The input NOR elements N–27 and N–28 are operative as a FLIP-FLOP circuit for storing the particular stage or bit N information of the binary number stored in the addend register 54. The carry signals are generated and propagated by the NOR elements N–17, N–18, N–19 and N–20. The convert bus 112 and the normal bus 114 provide control signals to distinguish between the operations in which $C_n=0$ and $C_n=1$ in effecting the desired differencing or subtraction. The NOR units N–21, N–22, N–23, N–24, N–25 and N–26 are operative to generate the change control signal D indicated in the above tables. The NOR circuits N–22, N–23, N–24 and N–25 are operative to examine their respective bits of the addend register and the preceding carry signals to see whether they are the same or different. To do this the NOR circuit N–23 monitors both the zero side of the addend register and the carry signal circuitry and another NOR circuit N–25 monitors the "one" side of the addend register and the negation of the carry signals supplied by the NOR circuit N–26. Note that actually the negation of the carry signal is received and presented by the carry circuitry. The carry information at terminals 95 and 97 is already negated. Two of the NOR circuits N–23 and N–25 are so set up as to provide output "one" signals if the addend and the carry are different and the two other NOR circuits N–22 and N–24 are set up to provide output "one" signals if the addend and carry signals are the same. The NOR circuits N–23 and N–25 that give a one signal output when they are the same are used for the addition and subtraction processes where no convert signal occurs. Therefore, when the addend and the accumulator are the same all four NOR circuits N–22, N–23, N–24 and N–25 have zero outputs and the execute NOR circuit gate N–21 to which all four of the NOR circuits are connected then provides an output pulse during the execute cycle. Should a one signal be transmitted to the NOR circuit gate N–21 from any one of the NOR circuits N–22, N–23, N–24 and N–25 it prevents the NOR gate N–21 from providing an output change signal to the accumulator during the execute cycle. The execute bus 126 carries a one value blocking signal except during the execution portion of the operation. This prevents the change signal D from being propagated except during the execution operation.

Note that the normal and convert buses 112 and 114 are the complements of each other and the normal bus is zero during normal operation, that is, when no convert signal is provided during subtraction. The normal mode of operation is when $F=D$; and the convert mode is when $F=$the complement of D. For the addition, multiplication and division operations $F=D$. For the subtraction operation $F=D$ when the number stored in the accumulator is larger than the number stored in the addend register and $F=$the complement of D for operation when the addend number is larger than the accumulator number. The convert mode of operation and the convert signal should be considered separately. During the subtraction operation, the convert signal controls the convert mode of operation.

*Shifting Operation*

The desired shifting of the accumulator register 50 is facilitated by the use of the illustrated binary counter shown in FIG. 6 as the fundamental unit in each stage of the accumulator register 50. In this regard, each of the binary counters 60 comprises a pair of FLIP-FLOP circuits. In their resting and non-input condition or state of operation, both of the FLIP-FLOPS contain the same reading with the upper FLIP-FLOP circuit being constrained to follow the status of the lower FLIP-FLOP circuit. Any input signal acts to isolate the upper pair of FLIP-FLOPS such that the upper FLIP-FLOP circuit acts to remember the past or previous operative state of the binary counter 60, and in addition sets the lower FLIP-FLOP circuit to the next state of operation. This same operation can be used with slight modification to effect the desired shifting operation to thereby decrease the required number of circuit components.

With reference to FIG. 6, the desired shifting operation is accomplished by isolating the upper FLIP-FLOP circuit including the NOR elements N–1 and N–2 from the lower FLIP-FLOP circuit including NOR elements N–5 and N–6 of each stage of binary counters 60 of the accumulator register 50 by applying the isolate signal to NOR elements N–3 and N–4 such that this upper FLIP-FLOP circuit retains the information respecting the present status of the accumulator register 50. A shift to the right or to the left is accomplished by connecting the upper FLIP-FLOP circuit including the NOR elements N–1 and N–2 to the lower FLIP-FLOP circuit of the next adjacent counter as shown in FIG. 6 and also in FIG. 21. For effecting a shift to the right, this requires a connection between the upper FLIP-FLOP circuit of a given binary counter 60 and the lower FLIP-FLOP circuit of the next adjacent binary counter to the right. A shift to the left, on the other hand, requires a connection between the upper FLIP-FLOP circuit of any given stage binary counter 60 and the next adjacent lower FLIP-FLOP circuit of the binary counter stage to the left. Thusly, in this manner the information contained in the upper FLIP-FLOP circuit is shifted and retained in the lower FLIP-FLOP circuit of the desired next adjacent stage binary counter 60. Thereafter, removing the signal applied to the isolating NOR elements N–3 and N–4 completes the action of the desired shifting operation by allowing the upper FLIP-FLOP circuit operative in the same counter stage with this respective lower FLIP-FLOP circuit to now reset to the status of this lower FLIP-FLOP circuit.

Referring to the accumulator stage N binary counter shown in FIG. 6, the NOR element N–10 has a terminal 142 connected to the output of the NOR element in the binary counter stage $N-1$ positioned in the left adjacent position relative to the particular binary counter for stage N as shown in FIG. 6, namely the $N-1$ stage. The latter NOR element corresponds to NOR element N–1 of stage N. The NOR element N–11 has its terminals 146 connected to the NOR element for the $N-1$ stage and corresponding to the NOR element N–2 shown for stage N. Similarly, the NOR element N–13 of stage N shown in FIG. 6 has its terminal 150 connected to the output of the NOR element corresponding to the NOR element N–1 shown in FIG. 6 for stage N, however, the terminal 150 is connected to the corresponding NOR element for the $N+1$ stage. The NOR element N–12 shown in FIG. 6 has its terminal 154 connected to the output of the NOR element for the $N+1$ stage corresponding to the NOR element N–2 for stage N of the accumulator register 50.

The shift left bus and the shift right bus shown at the bottom of FIG. 6 are normally energized with a one or unit value signal. However, when a shift left operation is desired the shift left bus is deenergized during the interval of isolate to allow the NOR elements N–13 and N–12 to perform the desired left shift. The same is true for the right shift operation, in which the right shift bus is deenergized during the interval of isolate to allow the NOR elements N–10 and N–11 to perform the desired shift right operation. The desired shift operation consists of allowing the contents of each of the upper sections of the register stages to set the same contents in the lower section of the adjacent binary stage either left or right as desired.

One of the primary advantages of using the illustrated binary counters 60 in the accumulator register 50 is the ease with which it allows the above-described information shifting operation to be accomplished, and this additionally permits a more simplified multiplication and division operation.

*Multiplication Operation*

Figure 8:
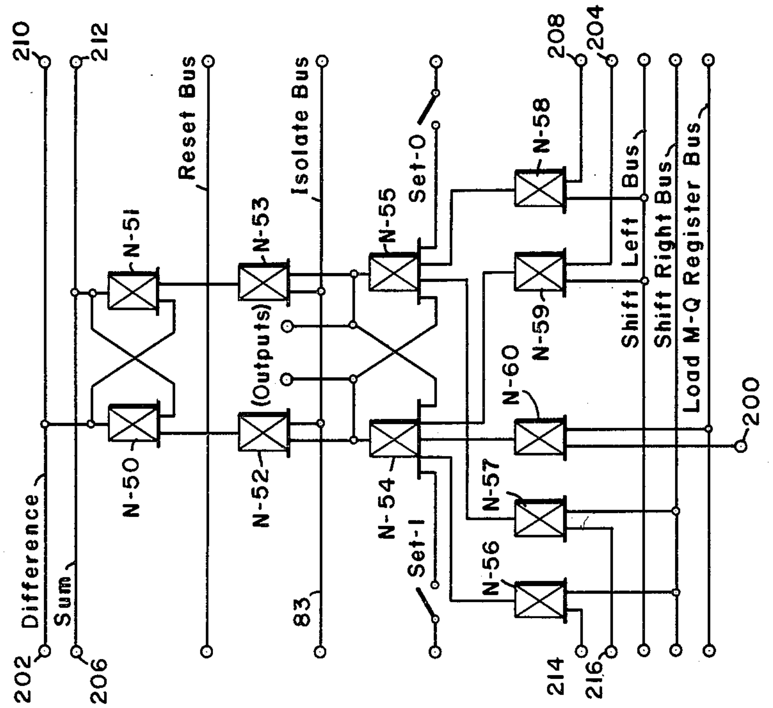
FIG. 8 is a schematic showing of the multiplier and quotient register circuit operative with an individual bit N of information.

The multiplication operation of the present computer device relative to two binary numbers is accomplished by the process of repeated addition or summing and shifting. The multiplier binary number is placed in a multiplier-quotient register 52 as shown in FIG. 4 and one stage of which is schematically shown in FIG. 8, and which is operative as a storage unit and has the same capacity as the accumulator register 50. If the binary number R which represents the multiplier stored in the multiplier and quotient register 52 includes the plurality of digits $R_1$, $R_2$, . . . $R_n$, the multiplier-quotient register 52 is operative to shift a binary number stored in said register 52 to the right if desired and such that the high order or most significant position $R_1$ can accept number bits from the accumulator register 50 position $A_n$. It is further operative such that the last position or lower order bit $R_n$ of the multiplier-quotient register 52 is sensed for determining whether to make an addition or not for multiplication. If it is zero, no addition takes place and only shifting occurs, and if it is one, the contents of addend register is added to the accumulator and then it is shifted to the right. The multiplicand binary number is stored in the addend register 54. During the shift right operation the high order position $A_1$ of the accumulator register 50 is set from the overflow signal storage of the P-bit $A_0$.

The multiplication process consists of first sensing the multiplier digit in $R_n$. If it is one, the multiplicand stored in the addend register 54 is added to the accumulator. However, if $R_n$ is zero, no addition takes place. Any overflow during such an addition appears in the P-bit or the $A_0$ stage. For multiplication, the carry signal $C_0$ is used to set the P-bit or stage $A_0$, and carry stage $C_n$ is not set equal to $C_0$ since there is no end-around carry operation here. Thusly, $C_n$ remains zero at all times. On a shifting operation to the right, $A_0$ sets $A_1$, $A_n$ sets $R_1$, and in general $A_X$ sets $A_{X+1}$, and $R_X$ sets $R_{X+1}$. The former stored number bit in the stage $R_n$ is lost. The new binary number in $R_n$ is the $R_{n-1}$ bit in the next adjacent stage of the register 52. This process is repeated until all digits of the multiplier are shifted to the right and thereby used up. The product will appear in the plurality of digits $A_1$ . . ., $A_n$, $R_1$, $R_n$. The $A_0$ stage will be zero.

For example, consider the multiplication of five and six in a simplified and purely illustrative three-bit arithmetic unit having a P-bit stage.

| A | R | |
|---|---|---|
| 0000 | 101 | (Initial operation. 110 is stored in addend.) |
| 0110 | 101 | (Right digit $R_n$ sensed as one, and 110 added to ACC.) |
| 0011 | 010 | (Shift right. $A_1=0$ since the P-bit $A_0=0$.) |
| 0011 | 010 | (Right digit sensed as zero, no addition.) |
| 0001 | 101 | (Shift right.) |
| 0111 | 101 | (Right digit sensed as one, and 110 added.) |
| 0011 | 110 | (Shift right.) |

The final answer 30 or 011110 appears in the accumulator register 50 and also the multiplier and quotient register 52 which are juxtapositioned together.

Initially five 101 is stored in the M–Q register and six 110 is stored in the addend register. The low order bit $R_n$ of the multiplier-quotient register, that is, the rightmost digit is sensed as a one, and the six 110 of the addend register is added to the contents of the accumulator giving zero in the P-bit and 110 in the accumulator and leaving the five 101 in the M–Q register. Then a shift right of the M–Q register and accumulator occurs and now the low order M–Q bit $R_n$ is zero. Therefore, no addition is made and the shift right is made again. Note that the contents of the accumulator are shifted into the M–Q register during the latter right shift. Now there is a one again in the low order bit $R_n$ of the M–Q register, and the six 110 of the addend register is added to the accumulator. A shift right is again made. The low order bit of the answer is now positioned in the low order bit $R_n$ of the M–Q register. Since only three digits were used to represent the binary number only three shift rights were necessary. If twenty digits are used, twenty shift rights are necessary with an addition being made prior to every shift depending upon whether a one bit appears or not in the low bit $R_n$ of the M–Q register preceding that shift.

The following is an example using the P-bit of the accumulator and showing the multiplication of seven times five.

| A | R | |
|---|---|---|
| 0000 | 111 | (Initial operation. 101 stored in addend.) |
| 0101 | 111 | (After addition.) |
| 0010 | 111 | (After shift right.) |
| 0111 | 111 | (After addition.) |
| 0011 | 111 | (After shift.) |
| 1000 | 111 | (After addition and resulting overflow into P or $A_0$ bit.) |
| 0100 | 011 | (After shift.) |

The above multiplication operation of seven times five occurs the same way except now the addition provides overflow into the P-bit of the accumulator register, and which overflow or P-bit retains the one. Then when the next shift right occurs, the one from the P-bit is shifted right into the most significant bit $A_1$ of the accumulator, which is the left-hand bit. More specifically, the third from last step requires an addition of five to three, the total of which is eight. The binary number eight must be represented in four bits as 1000; then when the right shift occurs the whole number is shifted.

*Division Operation*

The division operation whereby one binary number is divided by another binary number is accomplished by a process of differencing and shifting. The divisor is placed in the addend register 54 and the dividend is placed with high order bits in the accumulator register 50 and the low order bits, if any, in the multiplier-quotient register 52. The low order bits are used in this manner since it is possible to divide a forty bit number by a twenty bit number and come out with a twenty bit answer. The quotient is developed in the multiplier-quotient register 52. At the end of the division process, the quotient is in the multiplier and quotient register and the remainder is available in the accumulator register 50.

For the division operation shifting of the accumulator register 50 and the multiplier and quotient register 52 is to the left, and is set up such that the high order position of the accumulator register 50 can be used to set the P-bit, $A_0$. The P-bit is reset to zero on each execution of the differencing operation. This happens automatically during subtraction of the divisor number involved. Since the P-bit is not a part of the actual subtraction process, when the final answer occurs the P-bit should not be a part of the information.

The dividend is required to be smaller than the divisor. Therefore, the first differencing of the division operation checks and assures this by providing a convert signal when the latter situation is present. A failure of this checking can be used to stop the process by halting the advance of the time clock or initiate appropriate other corrective operations. The check determines whether the dividend is smaller than the divisor and is made by simply looking at the most significant bit or the high end order of the carry $C_0$. If a borrow signal, or a convert signal which is the same thing, is present as the carry bit $C_0$ this means that the divisor is larger than the dividend.

Therefore, division can and is permitted to take place. During the initial or first part of the division operation, the presence of the convert signal allows the division operation to proceed. Thereafter, when most significant carry bit $C_0$ equals one, this means that the divisor is larger than the dividend and no subtraction is necessary prior to a shift of the accumulator to the left. In other words, we have forehand knowledge that we do not have to make a subtraction and that it would be improper if made. However, if $C_0$ is zero, we know that the dividend is larger than the divisor and then a subtraction can be made, and a one entered into the least significant stage of the quotient register 52. The process is set up so that for any one step of the division operation when a convert signal is present ($C_0=1$) differencing does not take place and no quotient one is generated and a shift left is made. Otherwise, on the execute cycle, differencing does take place and a quotient one is generated before a shift left is made. This procedure ensures that the remainder has the same sign as the dividend.

In the division operation, the normal differencing connection of $C_0$ and $C_n$ is suspended whenever the P-bit is set or has a one valve signal entered into it. In other words, there is no end-around carry operation when P-bit equals one. This is necessary to develop the correct result. When the P-bit is set, the accumulator number A exceeds $2^n$. It is readily seen hence that $A/2$ must be less than the number B. Now the differencing operation is applied to the numbers $(A-2^n)$ and B, since the P-bit, $A_0$ is not a fully functioning part of the accumulator register 50. If $C_0$ and $C_n$ were connected, the difference quantity $[B-(A-2^n)]$ would be produced with the appropriate sign change, as the complement of the answer and not the true answer. However, if $C_0$ and $C_n$ are not connected, then $C_n=0$. Also the usual convert operation is suspended and the accumulator register 50 produces the difference quantity $(A-B)$, as required for the correct answer. This device enables the accumulator P-bit position $A_0$ to be built with fewer components. The P-bit $A_0$, is set by left shifts during the division operation and by carry $C_0$ during the multiplication operation. There is no change circuitry designed for the P-bit $A_0$, but it is automatically reset to zero on the execution of the differencing operation, since the $A_0$ or P-bit is not a binary counter but only a register and in operation is similar to an M–Q register bit or stage.

In the example below, consider that the binary point is located at the left of the $A_1$ stage.

Example 5/8 divided by 6/8. Addend register has .110.

| | Cycle | A | R | Remarks |
|---|---|---|---|---|
| 1 | First | 0.101 | 000 | Initial State. 5/8 set in accumulator. |
| 2 | Test | 0.101 | 000 | Test. A convert signal is generated indicating correctly that dividend is less than the divisor. Execution is not carried out. |
| 3 | Shift | 1.010 | 000 | |
| | Execute | 0.100 | 001 | Since no convert signal is generated as setting of P-bit $A_0$ suspends convert signal, execution occurs, and a one is entered in the right of the register. The position of the dividend in the register is not effected. |
| 4 | Shift | 1.000 | 010 | The spurious one in $A_0$ is lost. $A_0$ set again by $A_1$. |
| 5 | Execute | 1.010 | 011 | Same as step 3. |
| 6 | Shift | 0.100 | 110 | Same as step 4. |
| 7 | Execute Test | 0.100 | 110 | A convert is generated so that no differencing takes place and no quotient digit is entered. |

The answer of 6/8 appears in the quotient register and the remainder of 4/64 appears in the accumulator multiplied by eight. The binary point is not included in the machine, and in actual operation, is readily determined from the programming.

If the binary point is located somewhere to the right, so that integers are considered, this can be readily accomplished to provide six and a remainder of four. The criterion for division to be valid is, in this case, that the dividend is less than eight times the divisor, or $2^n$ times where $n$ is the number of stages.

*Periphery Circuits*

There are various periphery circuits provided in that, besides the actual circuits necessary for the desired arithmetic operations, certain periphery control circuits must be included in the arithmetic unit. These circuits provide such things as:

(1) The addition and subtraction sign.
(2) The multiplication and division sign.
(3) The shift circuit operation.
(4) The multiplication and division control circuits.

These circuits are all constructed out of the NOR circuit elements as in the rest of the arithmetic unit.

The present computer device is set up to act as a true algebraic calculator. In order to accomplish this, both the sign of the addend register 54 and the sign of the accumulator register 50 must be considered in the process as well as the given instruction whether it be either addition or subtraction.

In the following table, the possible cases are shown for addition and subtraction depending upon the algebraic sign of the accumulator register 50 and the addend register 54.

TABLE I

*Addition-Subtraction Sign Control Conditions*

| Accumulator Sign | Added Sign | Accumulator Magnitude | Addend Magnitude | Instruction | Process | Accumulator Final Sign | Sign Change |
|---|---|---|---|---|---|---|---|
| + | + | High | Low | Add | Sum | + | No |
| + | + | Low | High | Add | Sum | + | No |
| + | − | High | Low | Add | Diff | + | No |
| + | − | Low | High | Add | Diff | − | Yes |
| − | + | High | Low | Add | Diff | − | No |
| − | + | Low | High | Add | Diff | + | Yes |
| − | − | High | Low | Add | Sum | − | No |
| − | − | Low | High | Add | Sum | − | No |
| + | + | High | Low | Sub | Diff | + | No |
| + | + | Low | High | Sub | Diff | − | Yes |
| + | − | High | Low | Sub | Sum | + | No |
| + | − | Low | High | Sub | Sum | + | No |
| − | + | High | Low | Sub | Sum | − | No |
| − | + | Low | High | Sub | Sum | − | No |
| − | − | High | Low | Sub | Diff | − | No |
| − | − | Low | High | Sub | Diff | + | Yes |

Figures 9, 11:
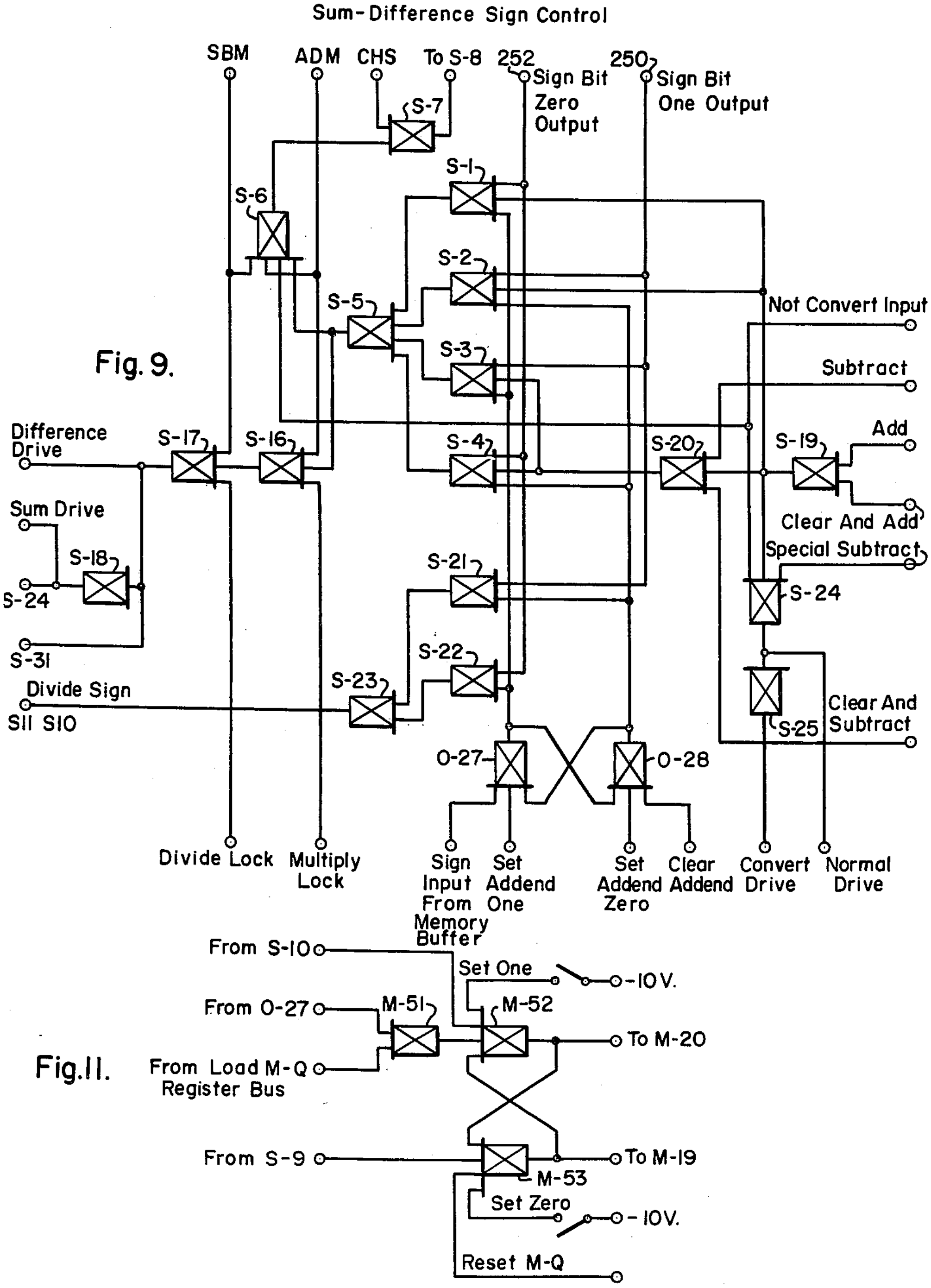
FIG. 9 is a schematic showing of the sum and difference sign control circuit.
FIG. 11 is the multiplier-quotient sign determining circuit.

In FIG. 9, the NOR circuit configuration for the sum and difference sign control is shown. NOR circuits 0–27 and 0–28 make up the addend register sign circuit. The output of the accumulator sign circuits including NOR elements 0–1 and 0–2 together with the output of the addend register 54 including NOR circuits 0–27 and 0–28 are fed into the sign matrix made up of NOR circuits S–1, S–2, S–3, S–4, S–5 and S–6. The convert signal and addition and subtraction instructions are also fed into this latter matrix circuit. The sign matrix is connected into NOR circuits S–16 and S–17 to determine the correct arithmetic process, whether summing or differencing, and whether the accumulator sign is to be changed. The addition instructions are fed in through NOR circuit S–19 and the subtraction instructions are fed through NOR circuit S–20. These are set up so either we add or subtract at all times, therefore the add and subtract instructions are the complement of one another and are derived with the additional NOR circuit S–19. The invert signal is entered as a negation of the convert into NOR circuit S–6 which is also in the sign matrix. For addition and most subtraction operations, the convert signal does not appear and the complement of the convert signal inhibits the change signal to the accumulator sign bit. During subtraction when the convert signal occurs this complemented convert signal does not inhibit the change in the sign bit accumulator.

The sign matrix also determines whether the accumulator bit is higher or lower in magnitude than the number bit stored in the addend register, and which is determined in pertinent cases by the convert signal as previously explained. The convert drive and normal drive control matrix including NOR circuits S–24 and S–25 is also shown in FIG. 9 for the subtraction case. The convert drive and normal drive control matrix is operative such that in subtracting a large number from a smaller number such as to get a convert of the changes in the accumulator a convert drive signal is given to the sum difference controls of all the bits. During addition and subtraction of smaller number from a larger number a normal drive signal is provided and allows normal changes to occur in the sum difference control of all the bits. This is activated by the convert and difference signal operating together at NOR element S–24.

The accumulator sign bit control circuit is shown in FIG. 10 and includes the NOR circuits 0–1, 0–2, and so forth through 0–11.

*Multiplication and Division sign*

In the multiplication and division operations for determining the sign, a separate sign circuit for the multiplier and quotient register 52 is required. This sign circuit, which is not in the accumulator-multiplier quotient registers' shift line, is shown in FIG. 11. This sign circuit is set for the division processes by the divide sign control circuit shown in FIG. 12A.

In multiplying and division operations, if both the numbers to be operated upon have the same sign, the answer is positive. If they have a different sign the answer will be negative.

Figure 12A:
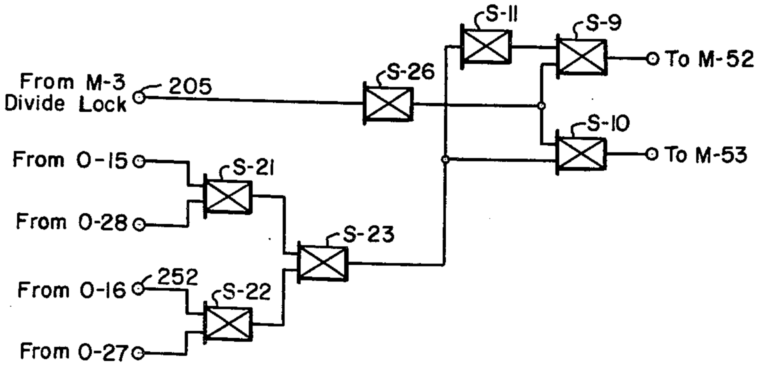
FIG. 12A is a showing of the divide sign control circuit and FIG. 12B is a showing of the multiply sign determining control circuit.

During the division operation, the sign setting NOR circuits S–9 and S–10 shown in FIG. 12A are released from their normal zero output position by the divide lock through terminal 205. The sign of the accumulator and addend registers are compared in NOR circuits S–21, S–22 and S–23. The multiplier and quotient register 52 is then set by the following rules:

(1) Set sign plus if accumulator and addend register signs are alike.

(2) Set the sign minus if the accumulator and addend register signs are different.

Figures 12B, 16:
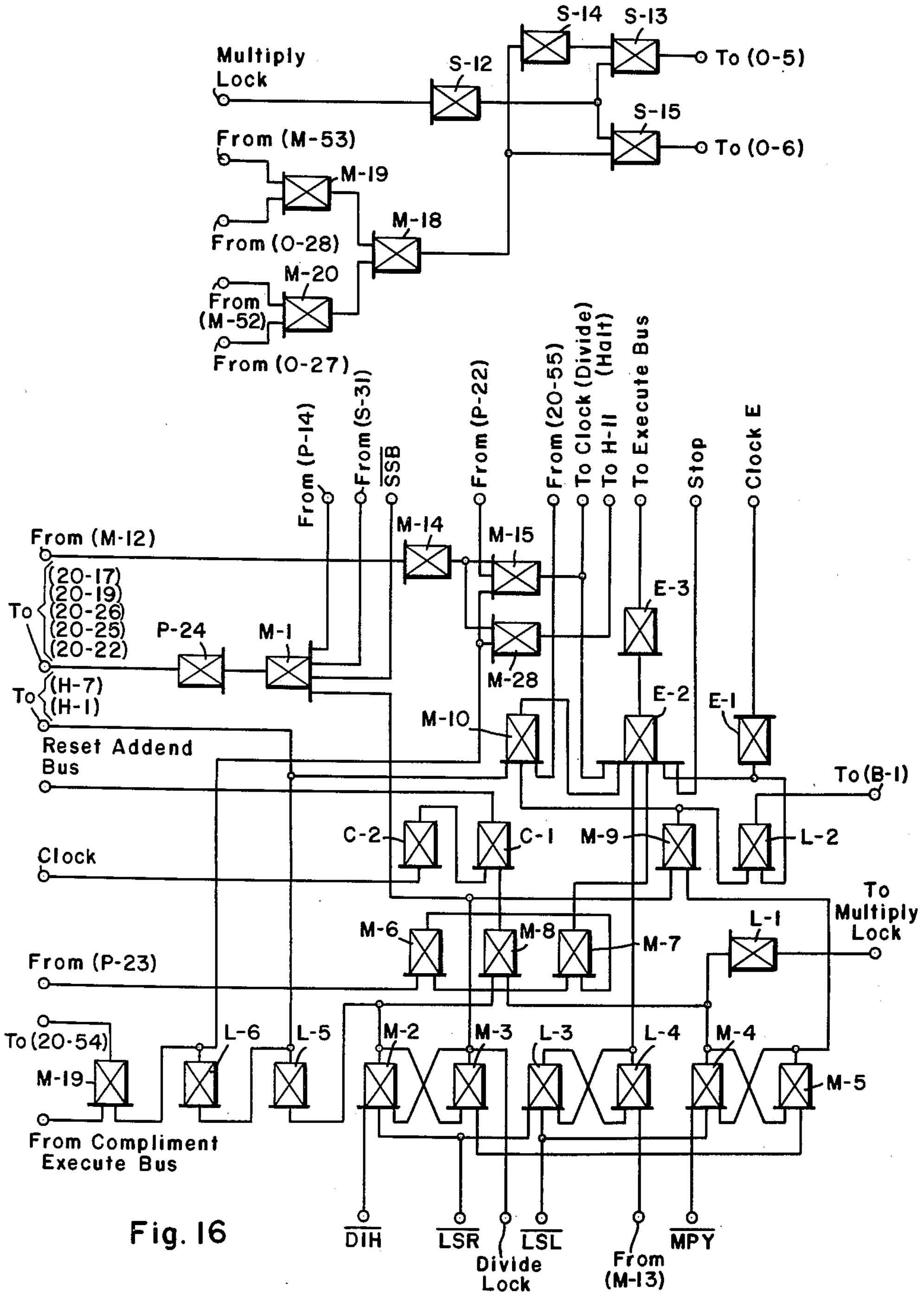
FIG. 16 is the multiply and divide control circuit.

For the multiplication operation, a similar sign control circuit is provided and shown in FIG. 12B. The signs of the addend register and multiplier and quotient register are compared by NOR circuits M–18, M–19 and M–20 and the sign of the accumulator is set according to the following rules:

(1) Set the accumulator sign plus if the signs of the addend and multiplier-quotient register are alike.
(2) Set the accumulator sign minus if the signs of the addend and multiplier-quotient register are different.

*Shift Control Circuits*

In order to perform a shift operation on the accumulator register and multiplier-quotient register, two steps are necessary. The first step in shifting is to isolate the upper FLIP–FLOP circuit of each stage of both the accumulator register and the multiplier-quotient register circuits from the respective lower half FLIP-FLOP circuits by a unit or one value isolate drive pulse applied to isolate bus 83 by the circuit shown in FIG. 13. When the FLIP–FLOPS are in this state of isolation, a shift left or a shift right drive pulse may be provided by removing for the pulse period the normally applied unit or one value signal from the NOR circuit H5 to respectively the shift left bus and the shift right bus and which connects the information in the upper FLIP-FLOP of a bit stage to the lower FLIP-FLOP of the desired adjacent bit stage. The isolate pulse must cover completely the time period duration that the shift pulses are operating by deenergizing the shift left and shift right buses. The clock circuit is therefore set up such that the shift pulse F shown in FIG. 19 occurs within the time period of the isolate pulse D.

Figure 13:
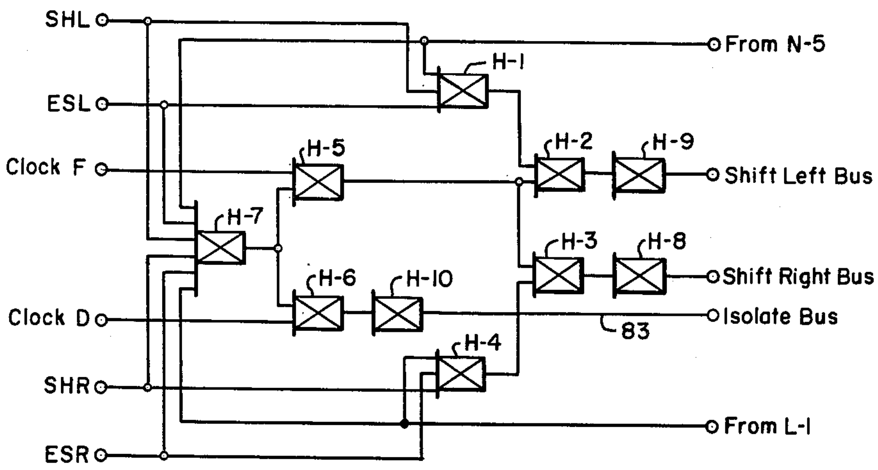
FIG. 13 is the shift control circuit.
Figure 14:
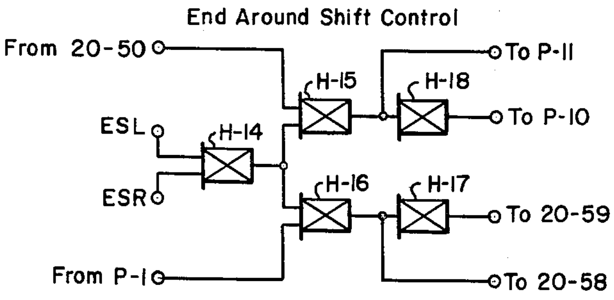
FIG. 14 is the end-around shift control circuit.

Six shift instructions are available in this manner. Shift right SHR and shift left SHL as shown in FIG. 13, end-around shift left ESL and end around shift right ESR which are logical shifts and are also shown in FIG. 14. The long right shift LRS and a long left shift LLS which are both shown in FIG. 16. The long shift is a 20-position or stage shift for a 20 stage register.

*Multiplication and Division Control Circuits*

Figures 15, 18:
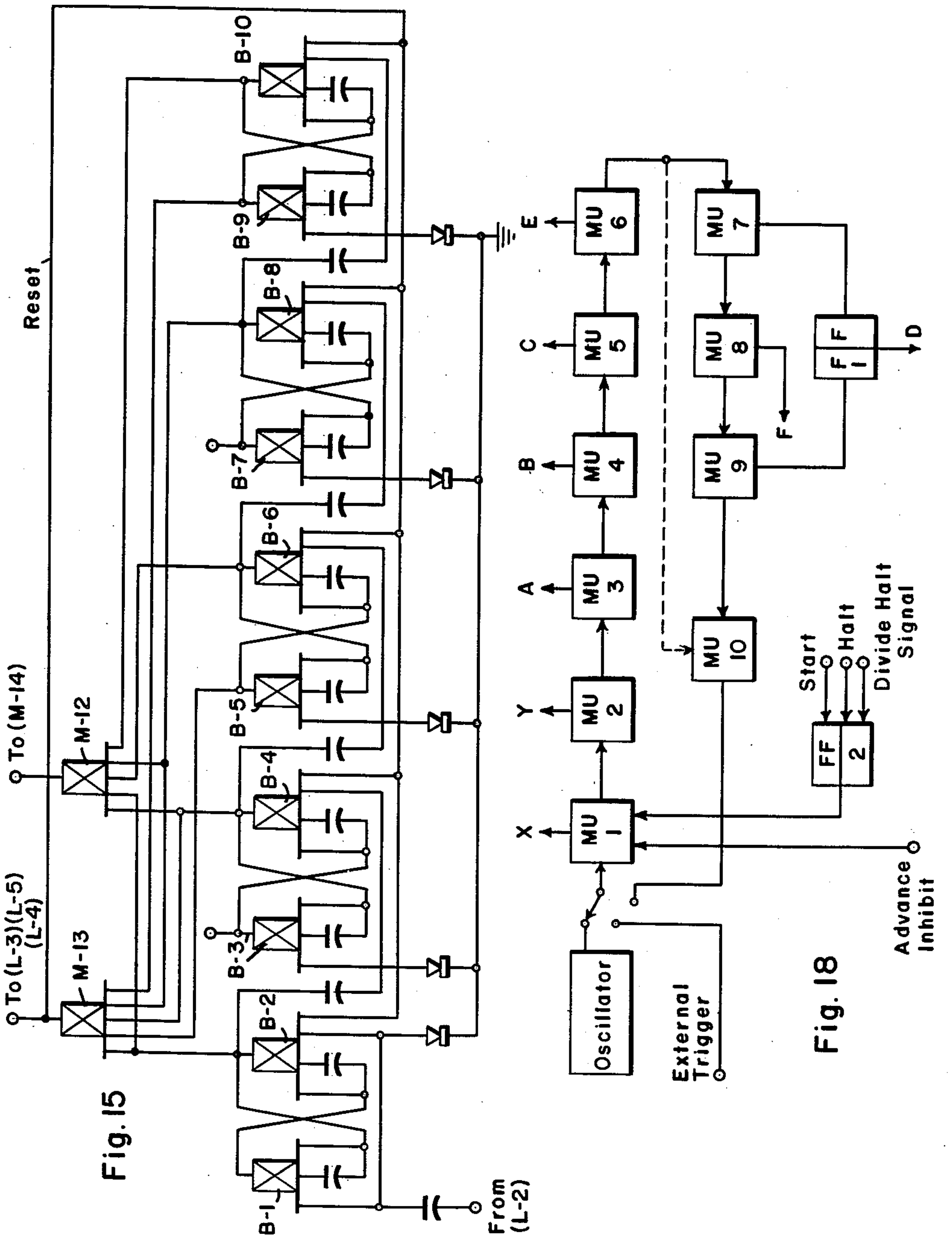
FIG. 15 is the multiplication counter circuit.
FIG. 18 is a block diagram of a suitable clock device as well known in the art.

In order to perform multiplication, a series of twenty conditionally add and shift sequences are necessary as described above. In this regard, a well known and prior art binary counter device as shown in FIG. 15 is utilized. The counter device shifts the accumulator register 50 and the multiplier-quotient register 52 to the right, with time allowed between each shift for a conditional addition as determined by the least significant or $R_n$ bit of the register 52 to take place during the execute operation. For effecting a division operation, this same binary counter device is used to shift to the left, with a conditional subtraction operation as controlled by the convert signal and taking place during the execute operation as previously explained. The counter allows this process to repeat for as many times as there are stages in the accumulator register 50.

In FIG. 16, the multiply and divide lock circuits are shown. These lock circuits act as gate circuits and allow the shifting to take place twenty times before another instruction is issued. In further explanation of this, it should be noted that normally every time a cycle occurs an instruction takes place which performs a different operation, such as a shift that may be an instruction and an add that may be an instruction. Every time such an instruction occurs, it must come from the instruction matrix as shown in FIG. 20A. However, in multiplication and division operations a complete operation requires twenty cycles of addition or subtraction and the inbetween shifting. Therefore, means are required to lock out the changes in instructions such that the twenty additional adds or subtracts and shifts may occur before a new instruction is received. In order to make sure that only twenty shifts and conditional addition and subtraction operations occur, a counter is provided that will actually count the number of the latter operations. Referring to FIG. 15, the NOR element M13 resets the counter and unlocks these gate circuits after twenty input pulses have been received. The NOR element M12 serves as an initial convert signal inspection of the division process by controlling the divide halt operation to see whether a legitimate division is called for, that is, that the number in the addend register is larger than the number in the accumulator register. If this relationship is present, a borrow or convert signal is provided in the carry output of the most significant bit $C_0$. For division, this is a convert signal. No actual conversion of the subtraction process takes place during the division operation. Therefore, the normal bus is always operating and the convert bus is never operating. If a halt operation is called for by the NOR circuit M12 of FIG. 15, halt occurs at the time a pulse is present on the output of the NOR circuit M12. This NOR circuit senses that all the counters are at zero position. If this output pulse occurs from NOR circuit M12, it is fed only to NOR circuit M14 shown in FIG. 16. This causes NOR circuit M15 to have a pulse output under the conditions that a pulse occurs on NOR circuit M12, a convert signal is brought around from the most significant bit stage $C_0$ and a division instruction also present from the instruction matrix. If all three of these things occur, this means a divide halt signal occurs. The condition is that we are dividing and on the very first operation with the counter set at zero, the accumulator is larger than the addend register such that a divide halt signal is given. It should be noted here that the presence of a convert signal is noted as the absence of a signal on NOR circuit P22 in FIG. 21E. If there is no convert signal, the accumulator is larger than the dividend and a one signal occurs on NOR circuit M15 and a divide halt operation occurs. The divide halt operation actually stops the computer from operation. It can also be used if necessary to provide an automatic shifting of the accumulator such that a proper division may actually occur and a correct answer arrived at by counting the required number of shifts for obtaining correct division and then shifting the final answer an equivalent number of times in the opposite direction. The original shift direction is right and the final shift direction would be left.

*Memory Unit*

The basic memory unit for the present computer device may be any of the well known prior art types of memory devices, such as a coincident-current ferrite core memory matrix driven directly by transistors. Although a 64 x 64 matrix may be employed, the following description applies to one memory device that has been actually provided for the present computer device and which is provided with 32 x 32 drive wires. Since twenty-one memory planes are used, this allows a storage of 1024 words of twenty bits each plus desired sign information. The drives consist of 149 power transistors, each operating in a configuration similar to the NOR circuit. Here a current pulse is used for a one value signal and the absence of that current pulse is used to indicate a zero value signal. These power transistors are used as $x$ and $y$ current drives and for providing an inhibit drive, as well known to persons skilled in this art. The operation of the computer is from what is known as a stored program. A series of instructions is loaded into the memory device in sequential locations. This information is stored in sequential addresses actually in the memory cores themselves. This program is then fed into the computer by a series of read input instructions. The initial read input instruction is automatically set up in the computer when the computer is reset by setting the instruction register 212 to the position zero. The reset pulse is applied to terminal 200 shown in FIG. 20A and which goes into the address control 250 and sets the instruction counter 252 to zero.

The memory device may be addressed through two sets of five FLIP-FLOP circuits forming a binary address circuit. Reading-in a word to the memory unit 204 is accomplished by means of a write one pulse on the selected core of every memory plane simultaneous to an inhibit pulse on all planes of the memory which are to remain in the zero state.

In order to make the memory read out in a non-destructive manner, a read-out pulse is always followed by a write pulse which rewrites back into the memory the information read out by utilizing a special read-out memory buffer as well known in this art. Information in a memory location is then never destroyed unless a new word is read into that location.

Any single word in the memory unit can be located by an $x$ and $y$ selection in two $x$ and $y$ drive matrices. These matrices are set up by a ten bit word which is supplied either by the instruction register 212 or the instruction counter 252 as shown in FIG. 20A.

Figure 17:
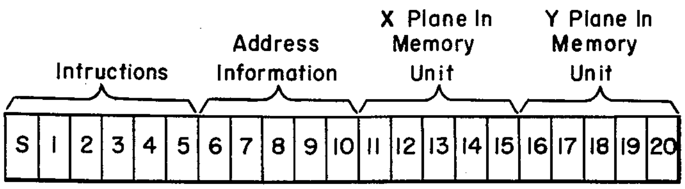
FIG. 17 is a diagrammatic illustration of the instruction and address register device.

In operation, a desired program is stored in sequentially addressed locations in the memory unit. An instruction counter 252 scans the stored program one instruction at a time, in sequence. The desired stored instruction is read out into the instruction register 212 shown in FIG. 20A. The instruction register contains twenty-one bit stages, the first six of which S, 1, 2, 3, 4, and 5 as shown in FIG. 17 are the instruction portion stages 210, the last ten bit stages 11 to 15 and 16 to 20 are the two memory addresses in the address portion 214 for location of the word to be acted upon. The remaining five bit stages 6 through 10 are the field select positions 215 and are used to address other memories, other registers, counters, external devices, analog-to-digital converters, and the like.

The above first six bit stages of the instruction are fed directly to an instruction matrix circuit 231 as shown in FIG. 20A. An example of an operation code for the various instructions is shown in Tables I and II above which is set up to utilize the form of the instruction as well as the numerical representation. For example, a one signal in the first digit after the sign signifies a transfer instruction while a zero signal signifies a non-transfer instruction. A one in the last digit is a non-execute instruction, while a zero calls for an execute pulse. This allows minimum duration of operation of particular instructions. This is discussed in somewhat more detail below relative to controlling the operation of the present computer device and is generally well known in this art.

The field select 215 allows the use of up to 31 additional 1024 word memory units or special sampled inputs such as analog-to-digital converter devices or the like.

*Input*

Input of information to the computer device may be accomplished by several methods well known in the computer art. The first method is direct input from a small console device. Here the addend register 54 and instruction register and instruction counter may be set up by the use of manual toggle switches. These are shown in FIG. 21 and identified as set one and set zero for the respective stages of the registers. Direct entry to the accumulator register 50 and the multiplier-quotient register 52 is also possible by this method. Input may also be directly from several analog-to-digital converter devices which are sampled at the correct time by a particular selection of the field select portion 215 of the instruction register to select a particular converter or other input device through the transfer matrix 218 as shown in FIG. 20B. This allows direct input of information into the computer device during operation. Interlock buffers which are well known may be supplied in the clock 235 to retain the correct sampling in this regard.

Mechanical input such as punched card or tape devices, as well as magnetic tape and photoelectric card and tape readers can also be used to supply the input. Input data is read directly into the memory unit in a sequential manner by simply addressing the instruction register to a particular memory location from which the storage operation is to start, and a load memory instruction to the instruction part of the memory unit. A load stop instruction is given in the input data to stop loading.

*Output*

Output of data from the computer is accomplished by several methods. The first method may be by direct observation of rows of neon lights provided for visual indication as known in the art and provided on the console for the accumulator register 50 and the multiplier-quotient register 52 and the addend register 54. One such light can monitor the output of each storage stage of bit position. Also, direct read out from either the accumulator or the multiplier-quotient registers is possible into digital-to-analog converts or mechanical devices, if desired. The information transfer matrix 218 shown in FIG. 20B is operative for this purpose. Each of the gate circuits shown in effect includes twenty one gating devices, such that twenty bits of information and a sign bit can be transferred from one input device, such as the tape reader 222, the converter 220 and the tape reader 202 to the computer apparatus as shown in FIG. 20A. Similarly, the information in the accumulator 50 can be transferred through the matrix 218 shown in FIG. 20B in the same manner. The timing clock 235 is connected through a suitable multiple conductor control bus 237 to the transfer matrix 218 to control the time period of opening the respective gate circuits. The instruction matrix 231 is similarly connected through a bus 239 for controlling the selection of opening the respective gate circuits. The correct output unit 219 is selected by a read select instruction followed by a series of read instructions for each bit of data to be read out.

Buffers, as well known, may be supplied for the output devices also.

*Control*

The control of the operation of the computer device can be separated into four main functions or operations consisting of instruction selection, address switching selection and information switching selection and timing.

For instruction selection, the instruction matrix circuit 231 shown in FIG. 20A is used to select the proper instruction to code the operation of the arithmetic unit 30, information transfer matrix 218 and the input and output devices. The instruction matrix circuit 231 is fed directly from the instruction portion 219 of the instruction register 212 as shown in FIG 20A This latter register together with the previously mentioned instruction counter 252 completely select any desired instruction at the desired time.

The address switching matrices 251 allow selection of the proper memory locations, input and output channels, and timing sequences. These matrices 251 are all somewhat similar in construction to the instruction matrix 231, but are less complicated. The information switching matrix 218 allows information to be transferred between the various registers by the proper opening in time and selection of gate circuits.

Perhaps, the most important control function is timing. The present computer device is designed to operate in either of two modes. The first mode is to allow timing to be set by an internal oscillator, thereby having a computer time that is not directly related to real time. The second mode of operation is wherein the train of clock pulses may be triggered from an external source, allowing the computer device to operate from a real time control. In both cases, the trigger, whether internal or external, sets off a train of single shot multivibrators or a similar clock device as is well known, which supplies the timing sequences. FIG. 18 shows a block diagram of a suitable clock construction including a chain of multivibrators MV1 through MV10 and FLIP-FLOP circuits FF1 and FF2, and illustrates the arrangement of these well known multivibrator circuits to form the pulse chains.

A non-shift instruction branch is included in the particular clock shown to illustrate one way of providing faster operation of non-shifting instructions by omitting the three shift multivibrators MV7, MV8 and MV9. The advance inhibit prevents an execute pulse from advancing the instruction counter on long instructions such as multiplication and division.

Figure 19:
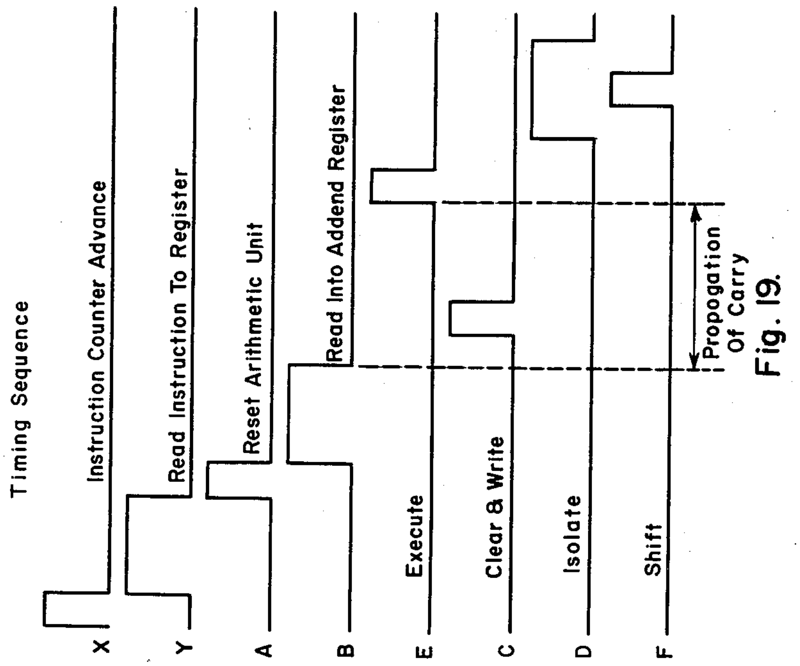
FIG. 19 is a curve chart illustrating the basic timing sequence for the present computer apparatus.

The curve chart shown in FIG. 19 illustrates the pulse chain relationship and illustrates the pulse sequencing but not necessarily the correct pulse intervals or shape. The first curve or X curve illustrates the advance instruction counter operation by one on each operation. The second curve or Y curve illustrates the read instruction out of storage addressed by the instruction counter 252 and entering into the instruction-address register 212. The third curve or A curve illustrates the reset of the addend register 54 of the arithmetic unit. The fourth or B curve pulse reads the contents of a memory location as selected by the address portion 214 of instruction-address register 212 into the addend register 54, and simultaneously the instruction portion 210 of the instruction register 212 sets the instruction matrix 231. The fifth or E curve illustrates the execute pulse, showing that the interval between B and E must be long enough to complete the desired carry propagation. The sixth or C curve illustrates the clear and write pulses which do not require carry propagation or execution. The seventh or D curve illustrates the isolate pulse for the accumulator register 50 and the multiplier-quotient register 52 to enable shifting. The eighth or F curve illustrates the shift pulse which occurs during the isolate pulse.

An alternate mode is introduced during the clock pulse for transfer operations. Since these operations as shown in Table II above require a comparison, and a decision to branch or not branch; a different, but shorter time sequence may be used. Here, after comparison, the execute clock pulse follows for no transfer, and for a transfer the instruction counter 252 is set by the address portion 214 of the instruction register 212 to have the same contents as the address portion of the instruction register.

A word or number from the input device 202 shown in FIG. 20B, such as a type reader device, may be read into the memory 204 in sequence through the provided gates in the information transfer matrix 218 as determined by the clock 235 respecting the timing that is desired and as determined by the instruction matrix 231 respecting the selection of the opening of the gate circuits. During input information loading, the input information is read into the memory cores of the memory unit 204 in sequence starting from position zero on up to the number of memory positions required to store the exact number of instruction words. During the read-in pulse, the instruction stored in the instruction portion 210 of instruction register 212 actually calls for the input to take place and the storage address portion 214 of the instruction register 212 designates the storage position that will be used. This method of information input is only the program input. The program input causes information to be read in through the X and Y inputs of the memory unit 204 at the right time and sequence position in the desired program. When the desired program has been read into the memory unit 204, a manual advance button 206 for the address control 250 is closed which starts the program into operation. The instruction counter 252 is set up at positions zero and so forth as required. This addresses the portion of the memory unit 204 as represented by the X and Y drive wires 217 which correspond to the desired address. The information in that address is read through the memory information output 216 into the instruction transfer matrix 218 where two things occur. The information is again read right back into the memory 204 since otherwise the memory would be destructively read out if this regeneration did not occur, and this information is also read into the instruction register 212. An instruction has now been located in the instruction register. The instruction portion 210 of the instruction register 212 sets up what instruction actually occurs whether it be add, subtract, read, write or any variety of other instructions that are employed in the use of the present computer. The address portion 214 operates through the address control 250 to select the X and Y drive wires 217 of the memory 204 such that a particular position in the memory to which a desired number is assigned is read into the addend register 54 of the arithmetic unit 30 through the information transfer matrix 218. The number referred to here for the X and Y drive wires is a memory address. In this memory address is stored a twenty-one bit word which represents a number, such as the numerical representation of a constant. However, it is also possible instead of reading directly out of the memory unit 204 to read desired numbers directly from any one of the input devices 202, 220 and 222 or other devices by suitably addressing the field select portion 215 of the instruction register 212 at the same time the address portion 214 is utilized. This latter desired number may be then put into the addend register 54. The instruction as developed by the instruction matrix 230 actually causes the accumulator 50 to operate on the said instruction. The instruction counter 252 in the address control 250 is then advanced by one notch, and the next sequence in the memory 204 is used. The cycle is then repeated again taking a new instruction word out of memory 204 and setting up a new instruction in the instruction register 212 and a new address in the address portion 214 of the instruction register 212. The contents of the address as designed by the address portion 214 of the register 212 is then again fed into the addend register 54.

It should be here noted that the apparatus as shown in FIGS. 20A and 20B, with the exception of the arithmetic unit 30 and the information transfer matrix 218, is well known and conventional prior art computer apparatus relative to structure and the operation thereof.

Now going through the whole operational sequence of the apparatus shown in FIG. 20A and FIG. 20B, information has been stored in the memory unit 204 and sequenced in proper order by the instruction counter 252 so we can complete the whole operation of the computer program as set up. Actually when answers are obtained, if desired these answers may be read out of the arithmetic unit 30 through the instruction transfer matrix 218 and directly to the output device 219. For example, supposing for a differencing type of operation a standard reference signal is supplied by tape reader 202 and an unknown or measured signal is supplied from an analog-to-digital converter 220. These are to be compared and the correct difference answer or number to be read out of the computer based upon this calculation. Perhaps the first instruction in the program would be to read the contents of the tape reader 202 into a memory location or perhaps directly into the accumulator 50 through the addend register 54. Then the contents of the converter 220 would be subsequently read into the addend register 54. Now a subtraction instruction would be provided at this time. The difference answer or number with the correct sign is then stored in the accumulator 50. The next instruction might be a read-out instruction. Then there might be provided an unconditional transfer instruction which says to go back to the first instruction, namely to read the contents of the tape reader 202 instruction as previously described, and repeat this earlier cycle.

Supposing as another example it is desirable to program the equation $A+B$ divided by $C$. The first three things that might be done is to read in and store the numerical values of A, B and C in various locations in the memory unit 204 and from suitable input devices. For example, A is the same reference number supplied by the tape reader 202 and B the same unknown number supplied by the converter 220 shown in FIG. 20B, and the number C is perhaps a predetermined correction factor. The number C may be stored in some particular memory location in the computer as a constant. Operation would proceed in the following manner. The instruction register 212 starts at zero which says clear the accumulator 50 and add the number A to the accumulator register 50. The second instruction would be to add the number B from the addend register 54 to the contents of the accumulator 50. Therefore, the quantity or number $A+B$ is now stored in the accumulator 50. The next instruction would be divided by the contents of the particular memory location where the number C is stored. The answer $A+B$ divided by $C$ is now stored in the M–Q register 52 with any remainder in the accumulator 50. The answer which now appears in the M–Q register must be read out and this may be accomplished by a read-out instruction. The read out occurs through the information transfer matrix 218 and could for example be to the output device 219.

There are certain instructions that occur which are of a different mode, that is, transfer instructions. The operation of the computer follows the program in sequence, however, at certain times it is advantageous to break the sequence in certain preferred manners. The transfer operation may occur in two ways. It may be a conditional transfer and it may be an unconditional transfer. A transfer instruction has in the instruction portion 210 of the instruction register 212 a particular binary numerical representation which actually designates it as the transfer instruction. The address portion 214 of the instruction register 212 now instead of storing a memory address as previously described now may have stored the new setting for causing the instruction counter 252 to change the sequence. For an unconditional transfer, the execution of this latter instruction setting causes the instruction counter 252 to be set to the same number as the address portion 214 of the instruction register 212. For a conditional transfer, the instruction is set up in the same manner but transfer may or may not occur depending on whether or not the condition is satisfied as described below. If transfer occurs, the instruction counter 252 is set to the same number as the address portion 214 of the instruction register 212. If transfer does not occur, the instruction counter 252 just advances to the next higher number in its normal order of sequence. This is used primarily for comparison. The condition may be on the fact that the number in the accumulator register 50 may be positive or negative or zero or that a number in the M–Q register 52 may be positive, or that the last addition has caused an overflow to occur in the accumulator register 50, or a convert signal to occur in the arithmetic unit 30 or various other bits of information which may be important in making decisions. The decision that is made on a conditional transfer is that if this occurs we take one branch, by changing the number in the instruction counter 252 to agree with number in the address part or of the instruction register 214, and if it does not occur we take a different branch by increasing the instruction counter 252 by one as discussed above. This also permits cyclic sub-routines as well known in the art to be included in the operation of the computer.

In FIGS. 21A, 21B, 21C, 21D, 21E, 21F, 21G and 21H there is illustrated a schematic diagram of the arithmetic unit of the present computer device and illustrates how all the aforementioned arithmetic unit components are interconnected and the overall functional operation of the arithmetic unit of the present computer device.

*Physical Construction*

In FIG. 21A there is shown the sign bit stage of the accumulator register and this same stage is shown also in FIG. 10. The P-bit or $A_0$ stage is shown in FIG. 21A and includes the NOR elements P–1, P–3, and so forth through P–6 as well as the shifting NOR elements P–10, P–11 and P–12 and P–13. In general all NOR elements elements with a P designation are operative with the P-bit and control therefor. Similarly, all NOR elements with an S designation are operative with the sign bit and its operation. The NOR element SS–0 shown at the top of FIG. 21B is for setting the sign bit to zero when all stages of the accumulator register are set at zero or positive state. The clear control circuitry shown in FIG. 21A between the sign bit stage and the P-bit stage and having a CL or CA designation is for clearing the accumulator register 50.

In FIG. 21B there is shown the $A_1$ bit stage of the accumulator register 50 and including the NOR elements having a one-dash designation. Also shown in FIG. 21B is an arbitrary N bit stage of the accumulator register and including the NOR elements having an N designation; these are also shown in FIG. 6.

In FIG. 21C there is shown the $A_{20}$ bit stage or last stage of the accumulator register 50 and including the NOR element having a 20 designation. Also shown is the $R_0$ bit stage of the M–Q register 52 including the NOR elements having a one-dash designation with identifying numerals above fifty. The M–Q register sign determining circuit including NOR elements M51, M52 and M53 is shown in the middle of FIG. 21C and also in FIG. 11.

In FIG. 21D there is shown an arbitrary N-bit stage of the M–Q register and including the NOR elements having the N designation and identifying numerals over fifty. This is also shown in FIG. 8. Also shown in FIG. 21D is the $R_{20}$ bit stage of the M–Q register 52 and including the NOR elements having a twenty designation with identifying numerals over fifty. The right-hand portion of FIG. 21D there is shown the clear control circuitry including the NOR elements designated CA for clearing the M–Q register 52. There is also shown the M–Q register loading circuitry cluding the NOR elements or circuits designated Q.

In FIG. 21E there is shown the sum and difference sign control circuitry as also shown in FIG. 9. There is also shown the divide sign control circuit as also shown in FIG. 12A and operative with the sign stage circuit of the M–Q register. In FIG. 21E there is also shown the multiply sign control circuit shown in FIG. 12B and operative with the sign bit stage of the accumulator register. The NOR elements S–30 and S–31 shown in FIG. 21E are for complementing the summing and differencing control buses respectively.

In FIG. 21F there is shown the sum and difference control circuitry for generating carry and change signals and connected between the $A_1$ bit stage of the accumulator and the $B_1$ bit stage of the addend register; this circuitry includes the NOR elements having a one designation and numerals 14 through 26. The addend register $B_1$ bit stage is shown and includes the NOR elements 1–27 and 1–28. The NOR element E–4 is provided for complementing the execute bus 126.

Also shown in FIG. 21F is the sum and difference control circuitry connected between the N-bit stages of the respective accumulator and addend register and also shown in FIG. 7. The NOR element for the latter circuitry have an N designation.

In FIG. 21G there is shown the summing and differencing control circuitry connected between and operative with the $A_{20}$ bit stage of the accumulator and the $B_{20}$ bit stage of the addend register. The NOR elements for this circuitry are designated twenty.

In the bottom and left portion of FIG. 21G are shown the rounding control NOR elements R1, R2, and R3. Also shown in FIG. 21G is the multiply and divide control circuitry as also shown in FIG. 16 and including the NOR elements having an M and an L designation. The NOR elements C1 and C2 are for clearing the addend register 54. The NOR elements E1, E2 and E3 energize the execute bus 126.

Figure 21H:
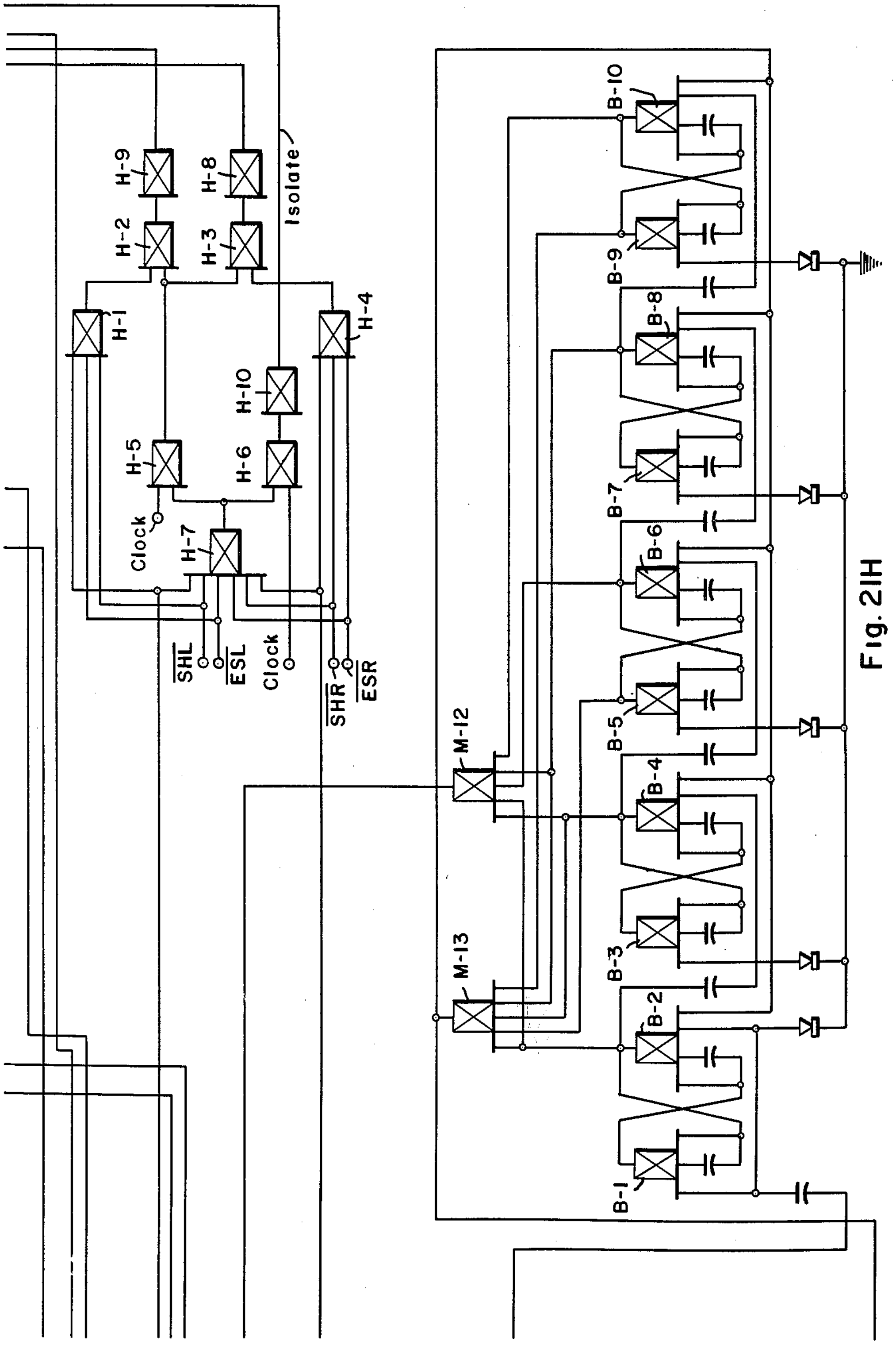

In FIG. 21H there is shown the multiplication counter circuit having the NOR elements with the B designation. This counter circuit is also shown in FIG. 15.

Also shown in FIG. 21H is the shift control circuitry including the NOR elements having the H designation for controlling the shift operation of the registers. This is also shown in FIG. 13.

It should also be noted relative to FIG. 21D that the end around shift control circuitry of FIG. 14 and including the NOR elements H14, H15, H16 and H17 is here shown. The NOR element H18 is shown in FIG. 21A operative with the P-bit stage of the accumulator register 50.

The drawings of FIGS. 21A, 21B, 21C and 21D should be put together end-to-end as a first portion of the arithmetic unit schematic diagram, and the drawings of FIGS. 21E, 21F, 21G and 21H should be similarly put together as a second portion and positioned below the above first portion to provide the complete schematic diagram for the arithmetic unit.

Other than the core memory, the circuitry is completely fabricated of transistorized NOR components.

Approximately 1100 transistors are used in the arithmetic unit which requires 38 transistors per bit. Three low voltage power supplies are required with the following characteristics:

—24 volts
+24 volts
+62 volts

These supply the total power for the computer device and are regulated to ±3%.

The present computer device is a high power general purpose computer device that can be readily adapted to special purpose problems arising in industrial automatic control of machine devices. The high reliability of the standardized components, and the wide range of allowable environmental conditions make this computer device extremely suitable for in-line industrial control operation.

It should be noted as being of interest that the presence of the convert signal enables this computer to perform directly various operations that are of value to control applications, and which prior art computers can only perform indirectly through the use of stored program instructions. The instruction called transfer-on-convert has been mentioned above. This instruction causes a transfer to a new set of instructions to occur when the number in the accumulator register 50 is smaller than the number in the addend register, otherwise the instruction has no effect on the course of the program. The comparison of the numbers in the accumulator register 50 and the addend register 54 is accomplished by the sum and difference circuitry to provide the convert signal, and with no arithmetic operation of subtraction being performed, so that the numbers in the latter registers remain unchanged. The instruction TRC transfer-on-convert could use the instruction —11011, for example.

Another instruction which is novel in this computer is the halt-until-convert-appears instruction. This instruction HTC could be —11000. This instruction enables the computer to stop its operation until the number in the addend register 54 is larger than the number in the accumulator register 50. This instruction causes the computer to suspend operation except for continual loading of the addend register 54 from some external input device such as an analog-to-digital converter 220. Consequently the computer operation will be suspended until the state of the external equipment as measured by the input device 220 reaches a specified reference value as stored in the accumulator register 50.

Another such command is the halt-until-overflow-appears instruction. This instruction operates similarly to the halt-until-convert-appears instruction, except that the computer operation is suspended until the sum of numbers in the addend register 54 and the accumulator register 50 exceeds the capacity of the computer by $2^n$. This instruction HTO could use the instruction —11001, for example.

Both of these instructions, halt-until-overflow-appears and halt-until-convert-appears, operate without using any arithmetic additions or subtractions consequently the reference number in the accumulator register 50 remains unchanged during operation with these instructions.

Although the present invention has been described with a certain degree of particularity, it should be understood that the present disclosure has been made only by way of example and that numerous changes in the details of construction and the combination and arrangement of parts may be resorted to without departing from the scope and spirit of the present invention.

We claim as our invention:

1. In binary digital computer apparatus operative for performing computation operations with binary numbers, the combination of a first register device for storing a first binary number, a second register device for storing a second binary number, convert signal providing means responsive to said first binary number and responsive to said second binary number for providing a convert signal operative to control the operation of said computer apparatus when said first binary number is larger than said second binary number, and change signal providing means responsive to at least one digit of said first binary number and at least one digit of said second binary number and another digit of said first binary number for providing a change signal when a predetermined arrangement of the latter said digits is sensed, with said change signal means and said convert signal means being operatively connected to one of said register devices for controlling another digit of said one register device.

2. In binary digital computer apparatus, the combination of an addend register device for storing a first binary number, an accumulator register device for storing a second binary number, convert signal providing means operatively connected to at least one of said register devices and responsive to said first binary number and responsive to said second binary number for providing a convert signal operative to control the operation of at least said one register device when said first binary number is larger than said second binary number, and change signal providing means responsive to at least two digits of said first binary number and at least one digit of said second binary number for providing a change signal when a predetermined arrangement of the latter said digits is sensed, with said change signal means being operatively connected to at least one of said register devices for changing a predetermined digit of the latter said one register device.

3. In binary digital computer apparatus, the combination of a first register device for storing a first binary number, a second register device for storing a second binary number, convert signal providing means operatively connected to at least one of said register devices and responsive to said first binary number and responsive to said second binary number for providing a convert signal operative to control the operation of at least said one register device when said first binary number is larger than said second binary number, and change signal providing means responsive to at least one digit of said first binary number and at least one digit of said second binary number for providing a change signal when a predetermined combination of the latter said digits is sensed, with said change signal means being operatively connected to one of said register devices for controlling at least one digit of the latter said one register device.

4. In binary digital computer apparatus, the combination of an addend register device for storing a first binary number, an accumulator register device for storing a second binary number, convert signal providing means responsive to said first binary number and responsive to said second binary number for providing a convert signal and being operatively connected to control the operation of at least one of said register devices when said first binary number is larger than said second binary number, and change signal providing means responsive to a predetermined digit of said first binary number and a predetermined digit of said second binary number and the next succeeding digit of said first binary number for providing a change signal when a predetermined arrangement of the latter said digits is sensed, with said change signal means being operatively connected to one of said register devices for changing at least one digit of the latter said one register device.

5. In binary digital computer apparatus operative with first and second binary numbers having a plurality of digits, the combination of a first register device for storing a said first binary number, a second register device for storing a said second binary number, carry signal providing means operatively connected to said first register device and said second register device for providing a carry signal in accordance with a predetermined digit of said first binary number and a predetermined digit of said second binary number, convert signal providing means responsive to at least one digit of said first binary number and responsive to at least one digit of said second binary number for providing a convert signal when said first binary number is larger in magnitude than said second binary number, and change signal providing means operatively connected to one of said register devices and to said carry signal providing means for providing a change signal when the next succeeding digit relative to said predetermined digit of the binary number stored in said one register device is different relative to said carry signal, with said change signal means being responsive to said convert signal and operatively connected to the other of said register devices for controlling the next succeeding digit relative to said predetermined digit of the binary number stored in said other register device.

6. In binary digital computer apparatus, the combination of an accumulator register for storing a first binary number having up to N digits, an addend register for storing a second binary number having up to N digits, carry signal providing means operatively connected to said accumulator register and to said addend register for providing a carry signal in accordance with a predetermined digit of said first binary number and a predetermined digit of said second binary number, convert signal providing means responsive to at least one digit of said first binary number and responsive to at least one digit of said second binary number for providing a convert signal when said first binary number is larger in magnitude than said second binary number, and change signal providing means operatively connected to one of said registers and said carry signal providing means for providing a change signal when the next succeeding digit relative to said predetermined digit of the binary number stored in said one register is different relative to said carry signal, with said change signal means being responsive to said convert signal and operatively connected to the other of said registers for controlling the next succeeding digit relative to said predetermined digit of the binary number stored in said other register.

7. In binary digital computer apparatus operative with binary numbers having a plurality of digits, the combination of a first register for storing a first binary number, a second register for storing a second binary number, carry signal providing means operatively connected to said first register and to said second register for providing a carry signal in accordance with at least one digit of said first binary number and at least one digit of said second binary number, convert signal providing means responsive to at least one digit of said first binary number and responsive to at least one digit of said second binary number for providing a convert signal when said first binary number is larger in magnitude than said second binary number, and change signal providing means operatively connected to said first register and said carry signal providing means for providing a change signal when another digit of said binary number is different relative to said carry signal, with said change signal means being responsive to said convert signal and operatively connected to said second register for controlling another digit of said second binary number.

8. In binary digital computer apparatus operative with multiple-digit binary numbers, the combination of an accumulator register for storing a first binary number, an addend register for storing a second binary number, carry signal providing means operatively connected to said accumulator register and said addend register for providing a carry signal in accordance with at least one digit of said first binary number and at least one digit of said second binary number, convert signal providing means responsive to at least one digit of said first binary number and responsive to at least one digit of said second binary number for providing a convert signal when said first binary number is larger in magnitude than said second binary number, and change signal providing means operatively connected to said addend register and said carry signal providing means for providing a change signal when another digit of said second binary number is different relative to said carry signal, with said change signal means being responsive to said convert signal and operatively connected to said accumulator register for controlling another digit of said first binary number.

9. In binary digital computer apparatus operative with binary numbers having a plurality of digits, the combination of a first register for storing a first binary number, a second register for storing a second binary number, convert signal providing means responsive to at least one digit of said first binary number and responsive to at least one digit of said second binary number for providing a convert signal when said first binary number is larger in magnitude than said second binary number, change signal providing means operatively connected to said first register and to said second register for providing a change signal in accordance with a predetermined relationship between at least two digits of one of said binary numbers and at least one digit of the other of said binary numbers, with said change signal providing means being responsive to said convert signal and operatively connected to one of said registers for controlling another digit of the binary number stored in said one register.

10. In binary digital computer apparatus operative with binary numbers having a plurality of digits, the combination of a first register for storing a first binary number, a second register for storing a second binary number, control signal providing means responsive to at least one digit of said first binary number and responsive to at least one digit of said second binary number for providing a control signal when one of said binary numbers has a predetermined relationship to the other of said binary numbers, change signal providing means operatively connected to said first register and to said second register for providing a change signal in accordance with a predetermined relationship between at least two digits of said first binary number and at least one digit of said second binary number, with said change signal means being responsive to said control signal and operatively connected to one of said registers for controlling another digit of the binary number stored in said one register.

11. In binary digital computer apparatus operative with first and second binary numbers having a plurality of digits, the combination of a first register for storing the first binary number, a second register for storing the second binary number, convert signal providing means responsive to at least one digit of said first binary number and responsive to at least one digit of said second binary number for providing a convert signal when said first binary number is larger in magnitude than said second binary number, change signal providing means operatively connected to said first register and to said second register for providing a change signal in accordance with a predetermined relationship between at least two digits of said first binary number and at least one digit of said second binary number, with said change signal means being responsive to said convert signal and operatively connected to said second register for controlling another digit of said second binary number.

12. In binary digital computer apparatus operative with first and second binary numbers each having a plurality of digits, the combination of an accumulator register for storing the first binary number, an addend register for storing the second binary number, convert signal providing means responsive to at least one digit of said first binary number and responsive to at least one digit of said second binary number for providing a convert signal when said first binary number is larger in magnitude than said second binary number, change signal providing means operatively connected to said addend register and to said accumulator register for providing a change signal in accordance with a predetermined relationship between a predetermined digit of said accumulator register, a predetermined digit of said addend register, and the next succeeding digit of said addend register, with said change signal means being responsive to said convert signal and operatively connected to said accumulator register for controlling the next succeeding digit of said first binary number stored in said accumulator register.

References Cited in the file of this patent

UNITED STATES PATENTS

| | | |
|---|---|---|
| 2,386,481 | Lang | Oct. 9, 1945 |
| 2,637,812 | Hagen | May 5, 1953 |
| 2,666,575 | Edwards | Jan. 19, 1954 |
| 2,700,504 | Thomas | Jan. 25, 1955 |
| 2,701,095 | Stibitz | Feb. 1, 1955 |
| 2,719,670 | Jacobs et al. | Oct. 4, 1955 |
| 2,845,222 | Genna et al. | July 29, 1958 |
| 2,954,166 | Eckdahl et al. | Sept. 27, 1960 |

OTHER REFERENCES

Engineering Research Asso. Inc. (ERA), 24-Digit Parallel Computer with Magnetic Drum Memory (px 29136), St. Paul, Minn., 1949, pp. 30, 33, 35 to 37, 39 to 41, and FIGS. 3.2–2, 3.3–11, 3.4–1 to 3.4–8, 3.4–15 to 3.4–21.